United States Patent
Schenfeld et al.

(10) Patent No.: US 9,256,547 B2
(45) Date of Patent: *Feb. 9, 2016

(54) MEMORY SWITCHING PROTOCOL WHEN SWITCHING OPTICALLY-CONNECTED MEMORY

(71) Applicant: INTERNATIONAL BUSINESS MACHINES CORPORATION, Armonk, NY (US)

(72) Inventors: Eugen Schenfeld, South Brunswick, NJ (US); Abhirup Chakraborty, Scarborough (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/822,615

(22) Filed: Aug. 10, 2015

(65) Prior Publication Data

US 2015/0370697 A1  Dec. 24, 2015

Related U.S. Application Data

(63) Continuation of application No. 13/760,942, filed on Feb. 6, 2013, now Pat. No. 9,110,818, which is a continuation of application No. 13/446,931, filed on Apr. 13, 2012, now Pat. No. 8,954,698.

(51) Int. Cl.
*G06F 12/00* (2006.01)
*G06F 12/10* (2006.01)
*G06F 12/02* (2006.01)

(52) U.S. Cl.
CPC ............ *G06F 12/10* (2013.01); *G06F 12/0284* (2013.01); *G06F 12/0292* (2013.01); *G06F 12/1027* (2013.01); *G06F 2212/683* (2013.01)

(58) Field of Classification Search
CPC . G06F 12/10; G06F 12/0292; G06F 12/1027; G06F 12/0284; G06F 2212/683; G06F 3/0647
See application file for complete search history.

(56) References Cited

U.S. PATENT DOCUMENTS

| | | | |
|---|---|---|---|
| 5,522,045 A | 5/1996 | Sandberg | |
| 6,233,681 B1 | 5/2001 | Kang | |
| 7,856,544 B2 | 12/2010 | Schenfeld et al. | |
| 8,127,111 B1 | 2/2012 | Wentzlaff et al. | |
| 2010/0239266 A1 | 9/2010 | Kash et al. | |
| 2011/0119344 A1 | 5/2011 | Eustis | |
| 2011/0231713 A1 | 9/2011 | Takada et al. | |

OTHER PUBLICATIONS

Abhirup Chakraborty and Eugen Schenfeld, "Switching Optically Connected Memories in a Large Scale System," IBM T.J. Watson Research Center, Yorktown Heights, NY, USA, 12 pages, 2012.

*Primary Examiner* — Reginald Bragdon
*Assistant Examiner* — Thanh D Vo
(74) *Attorney, Agent, or Firm* — Griffiths & Seaton PLLC

(57) ABSTRACT

Data is collected by an active node from passive nodes and arranges and stores the collected data on receiving nodes. A source node extracts the data format, and a remote memory blade identification (ID), a remote memory blade address, and ranges of the RMMA space, and composes and sends metadata to the receiving nodes and receiving racks.

33 Claims, 19 Drawing Sheets

1000

| NOTATIONS | DESCRIPTION |
|---|---|
| $T_x$ | TOTAL TIME FOR OPERATION X(X = MS-I, MS-O, R&S, G&W) |
| $B_{oc}, B_e$ | BANDWIDTH OF AN OPTICAL CHANNEL AND A LINK IN EDGE SWITCH, RESPECTIVELY |
| $N_i$ | TOTAL LINKS (PORTS) CONNECTED TO AN ACTIVE NODE $i$ |
| $N_p$ | TOTAL PASSIVE PROCESSOR BLADES/NODES CONNECTED TO AN EDGE SWITCH ($N_p >> N_i$) |
| $n_{ms-i}, n_{ms-o}$ | TOTAL SWITCH-IN AND SWITCH-OUT CHANNELS, RESPECTIVELY |
| $S_{data}$ | TOTAL DATA TRANSFER VOLUME (IN A PHASE OF AAP/AAB) |
| $n_{proc}$ | TOTAL PROCESSORS CORRESPONDING TO A PROCESSOR BLADE/NODE |
| $B_{inter}$ | TOTAL AGGREGATE BANDWIDTH OF INTER-RACK INTERCONNECTION (CORE AND/OR AGGREGATION SWITCHES) |

TABLE 1: NOTATIONS AND THE SYSTEM PARAMETERS

FIG. 10

MEMORY SWITCHING PROTOCOL WHEN SWITCHING OPTICALLY-CONNECTED MEMORY

CROSS REFERENCE TO RELATED APPLICATIONS

This application is a Continuation of U.S. patent application Ser. No. 13/760,942, filed on Feb. 6, 2013, which is a Continuation of U.S. patent application Ser. No. 13/446,931, filed on Apr. 13, 2012, now U.S. Pat. No. 9,110,818 issued on Aug. 18, 2015, which is a Continuation of now U.S. Pat. No. 8,954,698 issued on Feb. 10, 2015.

FIELD OF THE INVENTION

The present invention relates generally to computer systems, and more particularly to a memory switching protocol when switching optically-connected memory.

DESCRIPTION OF THE RELATED ART

In today's society, computer systems are commonplace. Computer systems may be found in the workplace, at home, or at school. Computer systems may include data storage systems, or disk storage systems, to process and store data. Recent trends in hardware and software systems introduce a memory capacity wall. With the continual increase in the number of central processing unit (CPU) cores within a chip, the increased processing capacity per socket demands increase in memory size to support increased OS footprint, high data volume, and increased number of virtual machines (VMs), etc. The rate of growth of per-socket memory capacity reveals that the supply of memory capacity fails to remain at par with the demand leading to loss of efficiency within the computing environment.

SUMMARY OF THE INVENTION

Recent trends in processor and memory systems in large-scale computing systems reveal a new "memory wall" that prompts investigation on alternate main memory organization separating main memory from processors and arranging them in separate ensembles. Multi-core trends in processor configurations incorporate an increasing number of central processing unit (CPU) cores within a chip, thus increasing the compute capacity per socket. Such an increase in processing capacity demands proportional increase in memory capacity. Also, operating systems and emerging applications (in-memory databases, stream processing, search engine, etc.) require increasing volume of memories due to increased operating software (OS) footprint and application data volume, respectively. In a virtualized system, increase in per chip core sizes implies the placement of increasing number of virtual machines (VMs) within a processor chip. Each of these factors demand increase in memory supplies at the chip level. However, projections on the rate of growth of memory capacity per socket reveal that the supply of memory capacity fails to remain at par with the demands. Therefore, a need exists for an optical interconnection fabric that acts as a bridge between processors and memory using a memory-switching protocol that transfers data across processors without physically moving (e.g., copying) the data across electrical switches. A need exits for allowing large-scale data communication across processors through transfer of a few tiny blocks of meta-data while supporting communication patterns prevalent in any large-scale scientific and data management applications.

Accordingly, and in view of the foregoing, various exemplary method, system, and computer program product embodiments for a memory switching protocol when switching optically-connected memory in a computing environment are provided. In one embodiment, by way of example only, in an optically-connected memory (OCM) system, data is collected by an active node from passive nodes and arranges and stores the collected data on receiving nodes. A source node extracts the data format, and a remote memory blade identification (ID), a remote memory blade address, and ranges of the RMMA space, and composes and sends metadata to the receiving nodes and receiving racks.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 10 is a table diagram illustrating the notations and corresponding system parameters for the memory switching operations;

DETAILED DESCRIPTION OF THE DRAWINGS

Figure 1:
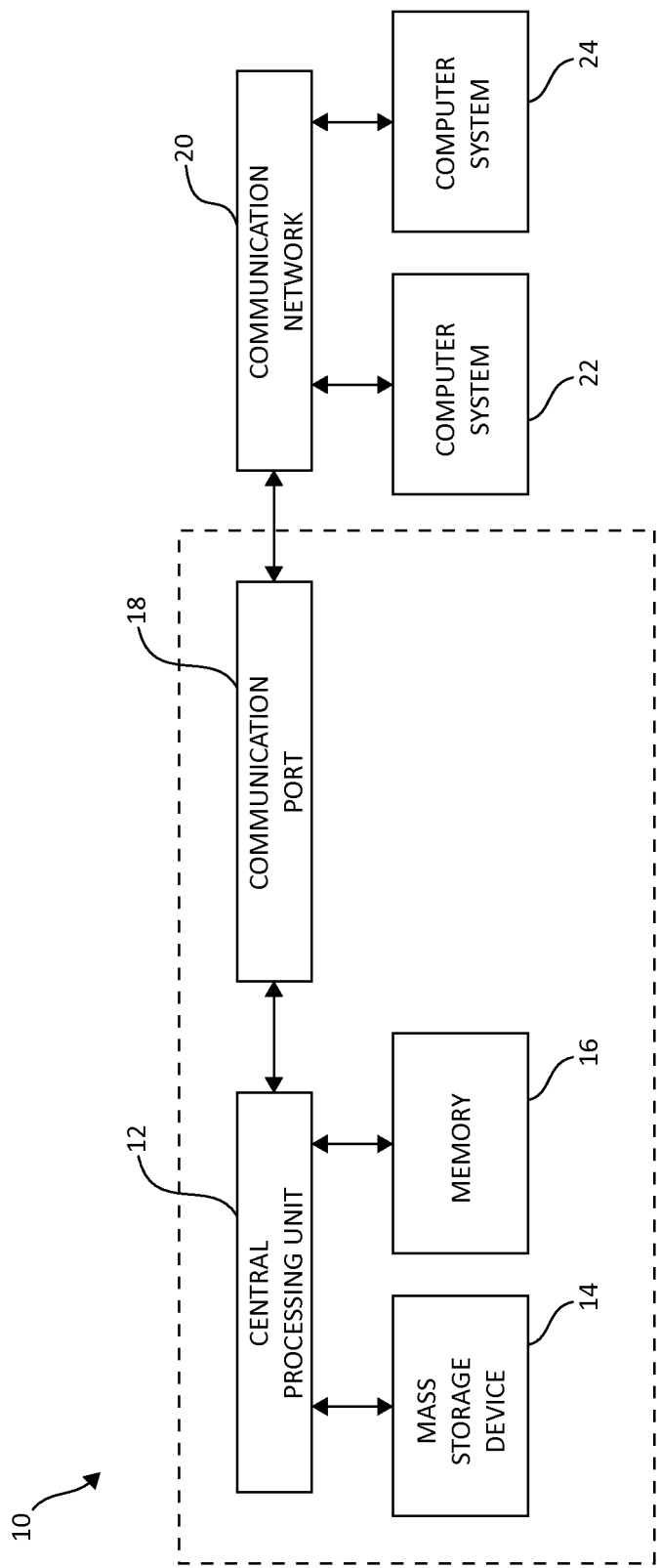
FIG. 1 is a block diagram illustrating a computing system environment having an example storage device in which aspects of the present invention may be realized.

In modern computer systems, memory modules may be tightly coupled with central processing unit (CPU)-cores through the system bus. Such a co-location of memory and processors precludes a few performance optimizations, for example, memory consolidation among a group of servers (processors), decoupling processor, and memory failures, etc. Also, temporal variations may exist in the usage of CPU and memory resources within and across applications. Such variations may be attributed to the data characteristics, variations in workload and traffic patterns, component (e.g., core) failures. Provisioning the system with the worst case memory consumption might result in underutilization of the resources, as the peak memory consumption is an order of magnitude higher than the average or low-baseline usage. Therefore, a new architectural structure and solution for allowing transparent memory capacity expansion and shrinking across the servers is provided.

In traditional systems, failure of either a processor or a memory module connected to the processor renders the resources (CPU and memory) within the ensemble unavailable. This situation increases the downtime of both the processor and the memories. With the increase in memory capacity, the server blades contain higher number of memory modules, which results in higher rates of Failure in Time (FIT). Such a frequent outage of the server ensemble limits the utilization of the system resources. Other challenges exist in large-scale data-center like system, including issues such as: maintaining large bisection bandwidth, scaling to a large number of nodes, energy efficiency, etc. In one embodiment, a large-scale system based on a separation of processors and memory is provided. In one embodiment, memory is optically connected for enabling a processor blade to allocate memory within a memory blade residing in any memory rack; such an allocation is feasible through creating a circuit switched connection, through optical communication fabrics, between the processor and memory blades. Designing a large system using existing high-radix switches and ensuring high bi-section bandwidth (i.e., with a limit on over-subscription ratio) is challenging, yet no system currently provides a solution that scales to a large number of nodes given the existing commodity switches and a large bi-section bandwidth requirement.

Moreover, in a modern large-scale data center, many data intensive applications require large volume data exchange among the nodes. These applications exhibit various data-transfer patterns: one-to-one, one-to-all (broadcasting), all-to-all (e.g., MapReduce, Database Joins, Fast Fourier Transform "FFT:), etc. The MapReduce communication pattern needs to shuffle a large volume of data while in a stream processing application and large volumes of data are collected at the stream sources that are dispersed within the data center, and sent to the nodes carrying out the actual processing. In a virtualized data center, various management workloads (e.g., VM patching, after-hour maintenance, automated load balancing through live migration, etc.) demand significant network bandwidth in addition to that of the traditional applications running on the system. The management workload increases as the data center scales up as new features (e.g., high-availability, recovery) become commonplace. Therefore, in a large scale data center, the communication bandwidth among the nodes becomes the primary bottleneck.

Therefore, the mechanisms of the illustrated embodiments seek to address these factors, as listed above, by providing a large-scale system based on a separation of processors and memory. In one embodiment, memory is optically connected for enabling a processor blade to allocate memory within a memory blade residing in any memory rack; such an allocation is feasible through creating a circuit switched connection, through optical communication fabrics, between the processor and memory blades. An optically attached memory system segregates memory from the processors and connects the two subsystems through optical fabrics. In addition to consolidating memory, improving the capacity per core, and decoupling processor and memory failures, the illustrated embodiments provide for transferring a large volume of data among the processors through memory switching via a transparent data transfer across the nodes and provide protocols for switching memory across the processors.

In one embodiment, various communications patterns with memory switching in a large-scale system are supported. Such patterns (i.e., all-to-all communication and broadcast) are performance critical for supporting a wide range of applications (i.e., Fast Fourier Transform "FFT", database joins, image correlation, video monitoring, etc.) in a massively parallel system. Considering the spatial distribution of data involved in switching, the illustrated embodiments offer at least two types of memory switching: gathering and non-gathering. Gathering type memory switching involves active nodes, which are the end points of memory switching activities and directly transfer (switch) a chunk of data to a remote active node. Non-gathering type memory switching includes each processor within an active node contributing a small fraction of the total data, and thus the data should be stored onto a different memory space before switching to another active node.

For a certain class of applications without any barrier synchronization requirements, optically switching memory reduces communication overhead by allowing the receiving node to resume the processing within minimal wait time. This is due to the avoidance of explicit data movement over the network, and of memory allocation or storage overhead at the receiving node.

In one embodiment, a solution for accessing memory in a less complex and more efficient (e.g. faster) implementation than using an ethernet network/protocol to access or change remote memory, via a datacenter network is depicted. In other words, providing a more efficient implementation architecture for a memory controller to access a dual in-line memory module (DIMM) in a processor blade and a memory blade. In one embodiment, for example, the protocol for the memory controller (part of the CPU/Processor chip) to communicate with the memory module (DIMM which may be made of several memory "chips" and control mechanisms) is more efficient than using an ethernet network/protocol to access or change remote memory, via a datacenter network. (A DIMM to memory controller connection may be referred to as point-to-point). The ethernet network/protocol will be more complex since a generic network needs to handle multiple needs of general communication as compared to the simple point-to-point connection between memory-to-processor with a memory controller. Thus, in one embodiment, the need for unification/generalization of doing everything with one network is reduced and/or eliminated, and in the alternative, optically (and/or electrically) connected components of the computing system as close as possible to the memory controller that is connected to DIMMs via the optically connected memory.

In one embodiment, a circuit switch is used (e.g., an optical switch but may be electrical in principle) to reconfigure/change/adapt the memory as needed on a longer time scale. Moreover, additional functionality is added while maintaining the simplicity of the point-to-point by acting on a larger scale ("memory bank"). The memory bank may connect to more than one processor in the data center at a time. Because the granularity of managing multiple access to remote memory is course (e.g., a granularity size of a gigabyte rather than per byte), once a memory section is associated with some remote processor through the optical circuit switch (or an electrical switch), a finer granularity is achieved because a particular memory section may be accessed by only one processor (or processor complex). The optically connected memory switching only allows for the specific processor to access the particular memory section. Other resources trying to gain access must use the specific processor that has access to the memory section, if a need arises for using the memory space by another resource. The granularity may be fine if the memory DIMM is located and connected to the Memory controller of that particular processor. In one embodiment all the functionality of the optically connected memory (including the coherency such as in symmetric multiprocessing "SMP") will be managed by a particular processor. As such, a low latencies is maintained and the latencies are kept as close to the speed of light traveling the distance between memory blade and processors (vs. typical much larger latency times with say Ethernet switches of few microseconds round trip). For example, at 5 nanosecond per meter fiber, a 30 meters data center distance round trip would be 300 nanoseconds.

In one embodiment, the data transfer overhead is decoupled from the volume of data that is to be transferred. Data is retained in the memory blades, and instead of sending the data to the remote processor blade; meta-data is sent to a remote processor blade. The meta-data contains necessary information to regenerate the mapping/page tables at the remote processor side using pages tables. The remote processor instantly starts to access data thereby eliminating a long wait time. Thus, at the remote processor side, it appears as if a large volume of remote memory space has just been allocated. In such a memory switching process, the overhead of transferring meta-data and regenerating the mapping tables is low. All-to-all communication pattern across a group of processors is supported, and such communication patterns are critical to attain high performance for a wide range of applications in a large-scale system.

It should be noted that the dynamic switching of memories allows for achieving a high volume data transfer and memory consolidation across the processors, blades, racks, etc. In one embodiment, the processors access remote memories through independent circuits (i.e., circuit-switched networks) established between the processors and the remote memory blades. A processor can have multiple remote channels through which the processor may access multiple remote memories. The processor(s) may teardown (e.g., disconnect) a circuit to a memory blade (module) and then signal another processor to establish a channel (i.e., circuit) with the memory blade. Thus the latter processor gains access to the data and physical memory space available in the remote memory blade. Each processor may also have, in addition, a local memory pool. The granularity (size) of remote memory chunk allows for balancing the costs and efficiency.

Moreover, as mentioned previously, the illustrated embodiments may be applied in a large system and allow for all-to-all switching capability so as to increase the complexity of the optical switches. Only a small number of nodes (active nodes), within a rack, will switch memory; and the rest of the nodes (passive nodes) send data to the active nodes, which store the data in memory and switch to the remote node (in a remote rack). The passive nodes communicate with the active ones through local or low overhead switches. Active nodes bypass the electrical router (or switches) by exchanging data through switchable memories using circuit switching. In case of memory gathering (before switching memories), the delay increases with data size, and thus, a set of specialized active nodes with multiple transceivers or channels may be used for transferring parallel data to the remote memory blade. In an Intra-Memory-Blade data transfer, the address space across the processor blades that share the same memory blade is adjusted. It should be noted that in one embodiment, the dynamic switching of memory may be performed through an electrical-switching fabric (and/or network) using a communication pattern to transfer memory space in the memory blades from one processor to an alternative processor in the processor blades without physically copying data in the memory to the processors.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EE- PROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
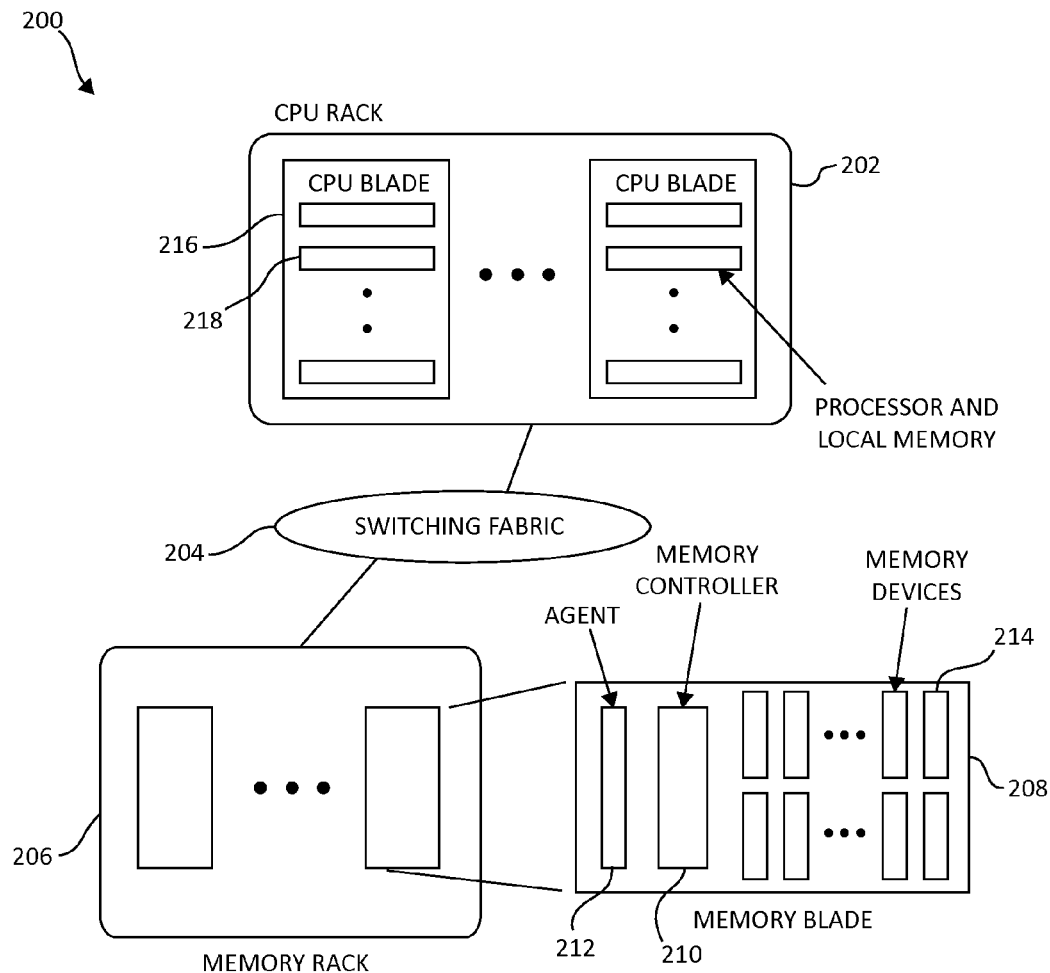
FIG. 2 is a block diagram illustrating a hardware structure of an optically connected memory system in which aspects of the present invention may be realized.

FIG. 2 is an exemplary block diagram 200 showing a hardware structure of an optically connected memory system in a computer system. The segregation of memory 214 from the CPU 218 through an optical interconnection fabric 204 is feasible due to the high bandwidth distance product of the optical link 204. In such an optically connected Memory (OCM) system 200, the CPU 218 and memory 214 are organized into separate racks 202 and 208 connected through optical links and at least one switching fabric 204. In the memory rack 206, memory blades 208 are arranged and communicatively coupled to other memory blades and a processor (CPU) rack 202. Each memory blade 208 houses multiple memory devices 214, an agent 212, and a memory controller 210. The CPU rack 202 includes processor blades 216 with each of the processor blades 216 communicatively coupled to other processor blades 216 and the memory rack 206. The processor blades 216 include processors 218, with each processor 218 containing local memory (not shown). The processors 218 (and respective physical computation nodes) inside a processor rack 216 are connected locally by a known fast interconnection means (not shown), which could be a direct connected network with some topology between the processors' 218 physical computation nodes within the processor blades 216, or a switch, through memory via a cache coherent symmetric multiprocessor (SMP) fabric, or a combination of the above. Each of the processors 218, processor blades 216, memory 214, and memory blades 208, share a number of optical external links. These external links are made for optimizing a point-to-point connection within the optical-switching fabric at very high bandwidth. This optimization may be in the physical implementation used, in the protocol chosen to facilitate such high bandwidth and has the ability to support memory switching within one physical link or multiple physical links to look like one high bandwidth physical link made of a few physical links. Since these external links are circuit switched, via at least one optical switch 204, data or content of such, these should use a very light-weight communication protocol.

Furthermore, the physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect in the optics domain, the light beams within these external links, regardless of their number of wavelength, protocol, and signaling speed. These external links are common to all memory blades and processor blades.

It should be noted that at least one optical circuit switch is shared between the optical external links. Also, several independent circuits may be established between the processors and the memory blades sharing the optical circuit switch. These external links are made for optimizing a point-to-point connection at very high bandwidth. This optimization may be in the physical implementation used, in the protocol chosen to facilitate such high bandwidth and has the ability to support aggregation of multiple streams within one physical link or multiple physical links to look like one high bandwidth physical link made of a few physical links. Since these external links are circuit switched, via an all optical switch that will not be aware of the protocol, data or content of such, these should use a very light weight communication protocol. Furthermore, the physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect in the optics domain, the light beams within these external links, regardless of their number of wavelength, protocol, and signaling speed. These external links are common to all processors, blades, memory, and independent circuits, such that any memory blade/processor blade may pass information on one or all of these external links, either directly or by passing through the interconnected processor blades. In one exemplary embodiment, circuit-switching switches are used. Circuit switching switches do not need to switch frequently, and thus may be much simpler to build, and can use different technologies (e.g., all optical, MEMS mirror based) to dynamically connect between the circuits, memory, and processor blades.

These types of external links (not shown) and dynamic switching enable very high throughput (high bandwidth) connectivity that dynamically changes as needed. As multi-core processing chips require very high bandwidth networks to interconnect the multi-core processing chips to other such physical processing nodes or memory subsystem, the exemplary optically-connected memory architecture plays a vital role in providing a solution that is functionally enabled by the memory switching operations.

The optically connected memory architecture 200 engenders numerous benefits: (a) transparent memory capacity changes across the system nodes, (b) eliminate notion of worst-case provisioning of memories and allow the applications to vary memory footprints depending on the workloads, and (c) decouple the CPU downtime from the memory module failure, thus increasing the CPU availability. As will be described below in other embodiments, an architecture for memory management techniques is provided. As shown in FIG. 2, the processor blades 202 host a number of processors 218, whereas the memory modules 241 are packed (e.g., arranged) in the memory blades 208. The processor blades 216 and memory blades 208 are organized in separate racks 202 and 206, which are interconnected through an optical switching fabric 204. Each of the processors 218 in the CPU blade 202 may have a local memory pool 310a-n, which is used for faster memory accesses. A memory blade 208 can integrate, in addition to dynamic random-access memory (DRAM) memory devices, alternate memory devices, such as Flash or phase-change-memory, without any changes to the CPU blades 216.

Figure 3:
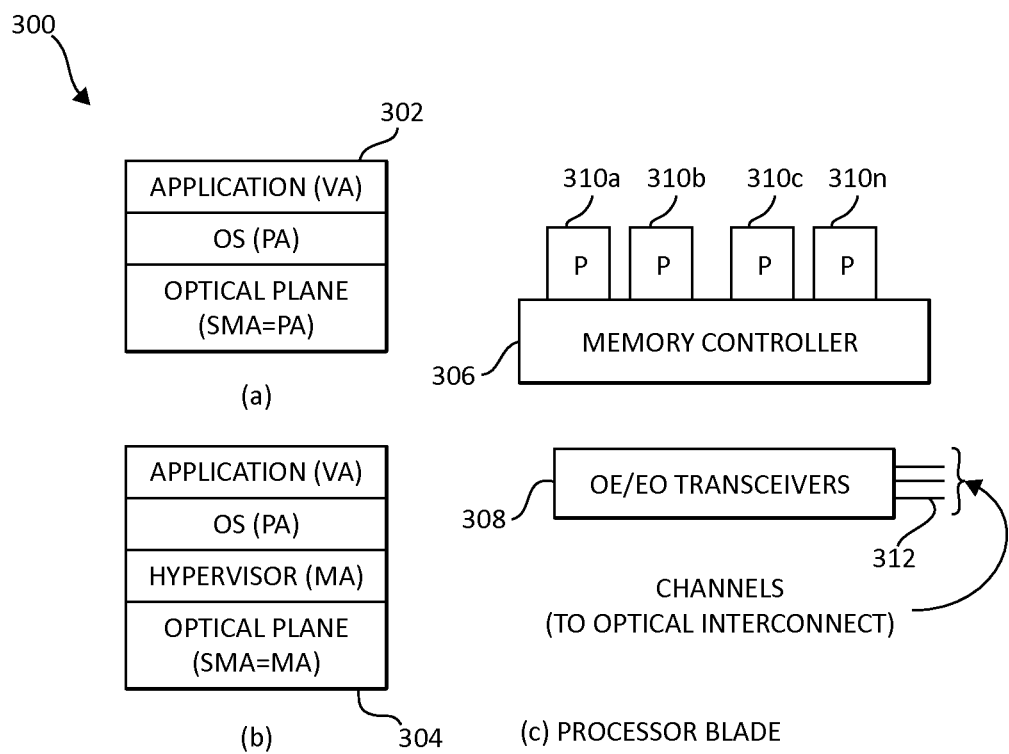
FIG. 3 is a block diagram illustrating a hardware structure of a processor design in the optically connected memory system.
Figure 4:
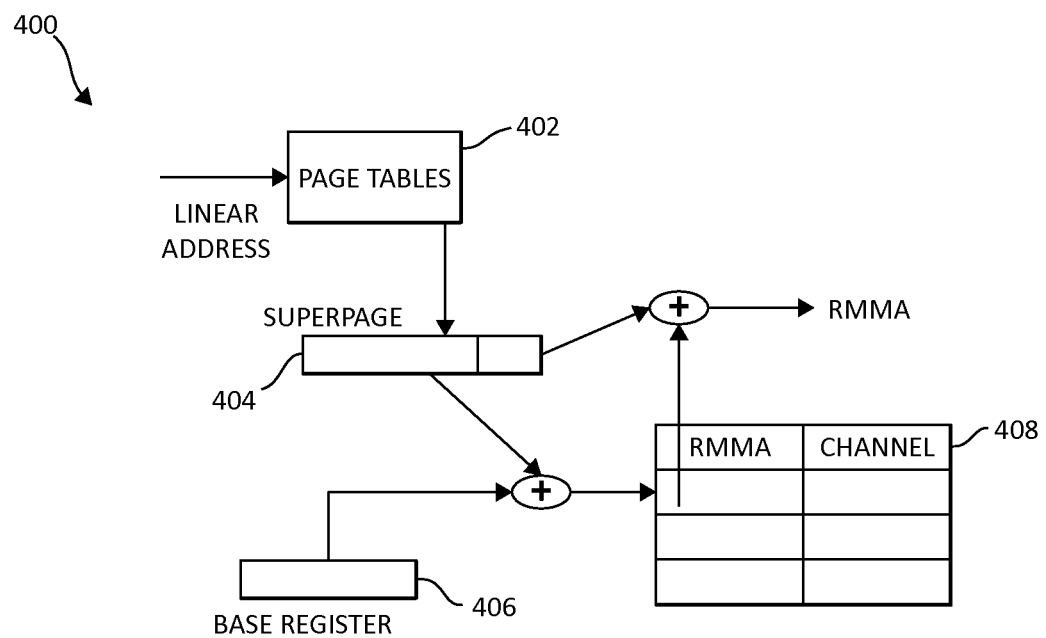
FIG. 4 is a block diagram 400 illustrating a hardware structure for accessing memory at the processor.

Turning now to FIG. 3 and FIG. 4, FIG. 3 is a block diagram 300 showing a hardware structure of a processor design in the optically connected memory system in a computer system. FIG. 4 is a block diagram 400 illustrating a hardware structure for accessing memory at the processor. As illustrated in FIG. 3, the processor side design 300 illustrates: (a) software stack in system (without virtualization) 302 and 304 (with virtualization) and (b) the processor blade communicates with remote memory blades through optical transceiver 308 and 312. There is a memory controller 306 associated with local memory pool 310a-n. As illustrated in FIG. 4, a linear address is mapped to a system memory address (SMA) space (by page tables in operating software "OS" and virtual memory managers (VMM). It should be noted that each processor node 218 (see FIG. 2) maintains, for both remote and local memory, a single address space called System Memory Address (SMA) space. If the SMA (as shown in 302 and 304 of FIG. 3) is above a certain, predefined limit, the SMA is mapped to a remote memory address (RMMA) space 408 (as shown in FIG. 4) and the access request is routed to the remote memory blade through the proper channels. It should be noted that the memory blade 208 (see FIG. 2) maintains a separate address space called Remote Memory Address (RMMA) space.

In an optically connected memory system (see FIG. 2 200), each processor node 218 maintains, for both remote and local memory, the SMA space. The processor node 218 maps the local physical memory to the lower portion of this address space. The remote memory is mapped to the available (i.e., higher) SMA address space (shown in 302 and 304). At the remote memory side, the memory blade 208 maintains the RMMA (as shown in 408 of FIG. 4). Therefore, each memory access at the processor side should first be mapped to the SMA space (as shown in 302 and 304 of FIG. 3). If the SMA (as shown in 302 and 304) corresponds to the remote memory, the SMA (as shown in 302 and 304 of FIG. 3) is mapped to the RMMA (as shown in 408 of FIG. 4), and this RMMA is sent to the remote memory blade 208. The optical plane translates the SMA (as shown in 302 and 304 of FIG. 3) to the respective RMMA (as shown in 408 of FIG. 4) and interacts with the remote memory, as illustrated in FIG. 3.

The processor blade (as shown with components 306, 308, and 310a-n in FIG. 3) connects to the remote memory through Electrical-to-Optical (EO)/optical-to-Electrical (OE) transceivers 312 which are connected to, for example, a Northbridge chipset. Note that in a virtualized system the SMA (as shown in 302 and 304 of FIG. 3) corresponds to the Machine Address (MA) (as shown in 302 and 304), and in a system without virtualization the SMA (as shown in 302 and 304 in FIG. 3) corresponds to the physical address (PA) (as shown in 302 and 304 of FIG. 3). As shown in the FIG. 3, each processor blade (shown with components 306, 308, and 310A-N) may have simultaneous connections to multiple memory blades through separate channels. Here, in case of a single-mode optical fiber, a channel corresponds to a separate optical transceiver, whereas with wavelength-division multiplexing (WDM) a single transceiver may provide multiple channels.

The block size for the remote memory (for example a remote memory page) is an order of magnitude larger than that for the local memory. Therefore the table (e.g., a remote memory page table) mapping the SMA (shown in 302 and 304 of FIG. 3) to RMMA (as shown in 408 of FIG. 4) can be stored in the local memory. A set of remote memory pages is stored in local memory to make the access faster. In short, upon a translation look-aside buffer (TLB) miss, the linear address from the application is mapped to the SMA (as shown in 302 and 304 in FIG. 3) space by a number of page tables 402 (see FIG. 4) maintained by the OS and Virtual Machine Monitor (VMM). If the SMA (as shown in 302 and 304 in FIG. 3) is above a threshold (which corresponds to the local memory size), it is mapped to the RMMA (as shown in 408 of FIG. 4) space and sent to the remote memory (see FIG. 4 below). The remote memory superpage 404 (see FIG. 4) is brought into the local memory and evicts, if necessary, a superpage 404 (see FIG. 4) from the local memory, and then the page tables 402 (see FIG. 4) are updated accordingly. A base register 406 is also used for assisting in the memory switching operations.

Figure 5:
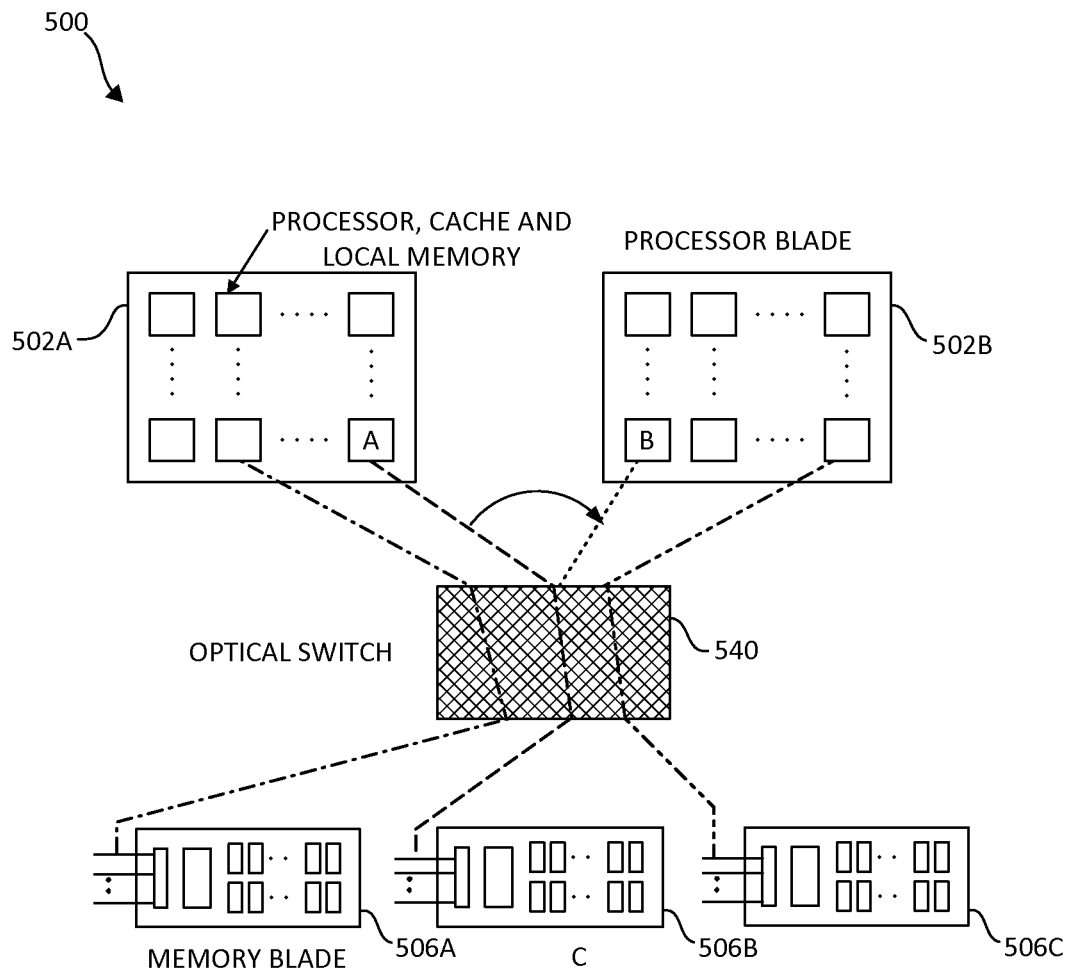
FIG. 5 is a block diagram illustrating a hardware structure for switching memory through an optical interconnection fabric in a computer system in which aspects of the present invention may be realized.

In an optically connected memory (OCM)-based system (as seen in FIG. 2 200), processor nodes access remote memories through independent circuits established between the processor nodes and the remote memory blades. Turning now to FIG. 5, an exemplary block diagram 500 showing a hardware structure for switching memory through an optical interconnection fabric in a computer system is depicted. Processor B 502B establishes a circuit with the remote blade C 502C and gains access to the data previously held by processor. As outlined above in FIG. 2-4, a processor node has multiple channels to the remote memory blades; also, each of the memory blades is equipped with multiple channels, enabling the memory blades to be shared across multiple processor nodes. The optical channels (in a memory blade or a processor node) are provided by one or more optical transceivers. A processor node 502 (show as 502 A and 502B) can allocate memory from a remote memory blade by initiating a circuit with the memory blade 506 (shown as 506a-c) and sending the memory request to the remote memory controller. In such a memory system, a processor node holding super pages within a remote memory blade can signal another processor to establish a circuit with the remote memory blade 506 (shown as 506a-c) initiating a transfer of memory space to the latter processor node. The former processor node can send the RMMA address space to the receiving processor node, which can access the same data resident on the supplied address space. The sending processor may tear down (e.g., disconnect) the circuit with the remote memory blade 506 (shown as 506a-c) if it no longer requires any superpages at that memory blade. Such a process of transferring address space across processor nodes is referred to as memory switching. The memory switching process is shown in FIG. 5, where a processor node A 502A sends data stored in a remote memory blade C 506 to a processor node B 502B. The processor B 502B initiates a circuit with the remote memory blade C 506. Note that as a memory blade 506 may have multiple channels, the memory space of the memory blade 506 may be shared across multiple processor nodes, each memory space occupying a non-overlapping portion of the total space within the memory blade 506. Also, the source and destination side of memory switching may be referred to as switch-out and switch-in operations, respectively. In the embodiments listed below, the (remote and local) memory management issues and the switching protocols are described.

To further illustrate the memory switching protocol, consider the following. At the source rack/node side, the metadata and a switching request to the destination rack/node is sent. A remote machine memory address (RMMA) space is adjusted and a translation look-aside buffer (TLB) is flushed. The circuit may be disconnected (e.g., torn down) if necessary. At the destination side, the metadata is received and a circuit may be set up (if a circuit does not already exist on the destination side). The RMMA space is grafted (e.g., joined) onto the available SMA space and the mapping table (for the remote memory) is regenerated. For switching the memory data, one or more options for the switching may be employed; 1) switch the memory data, 2) gather or collect the memory data at a different module and then switch, and/or 3) move the redundant data to a different memory module.

In one embodiment, address space management is employed. While switching memories by signaling a remote processor node, the remote processor node should receive the address space of the remote memory blade (i.e., RMMA space) that contains the data to be transferred. Upon receiving the RMMA space, the receiving processor should map the RMMA space to the free portion of its SMA space, and create the page table entries corresponding to the received RMMA space. Thus, from the receiving processor's perspective, the process is similar to physical (remote) memory allocation.

Here, the optical plane supplies a fixed set of remote memory superpages, and the processor node assimilates the extra superpages by grafting the extra superpages into its SMA space, creating the necessary mapping within the page tables. Therefore, at the receiving processor side, the applications can transparently access the remote memory superpages. The memory controller at the remote memory blade observes, for the same data, the same RMMA as in the source processor node. A processor device (e.g., CPU) may be used to assist the memory controller in performing any of the required features of the illustrated embodiments relating to the memory on the memory blades.

Figure 6:
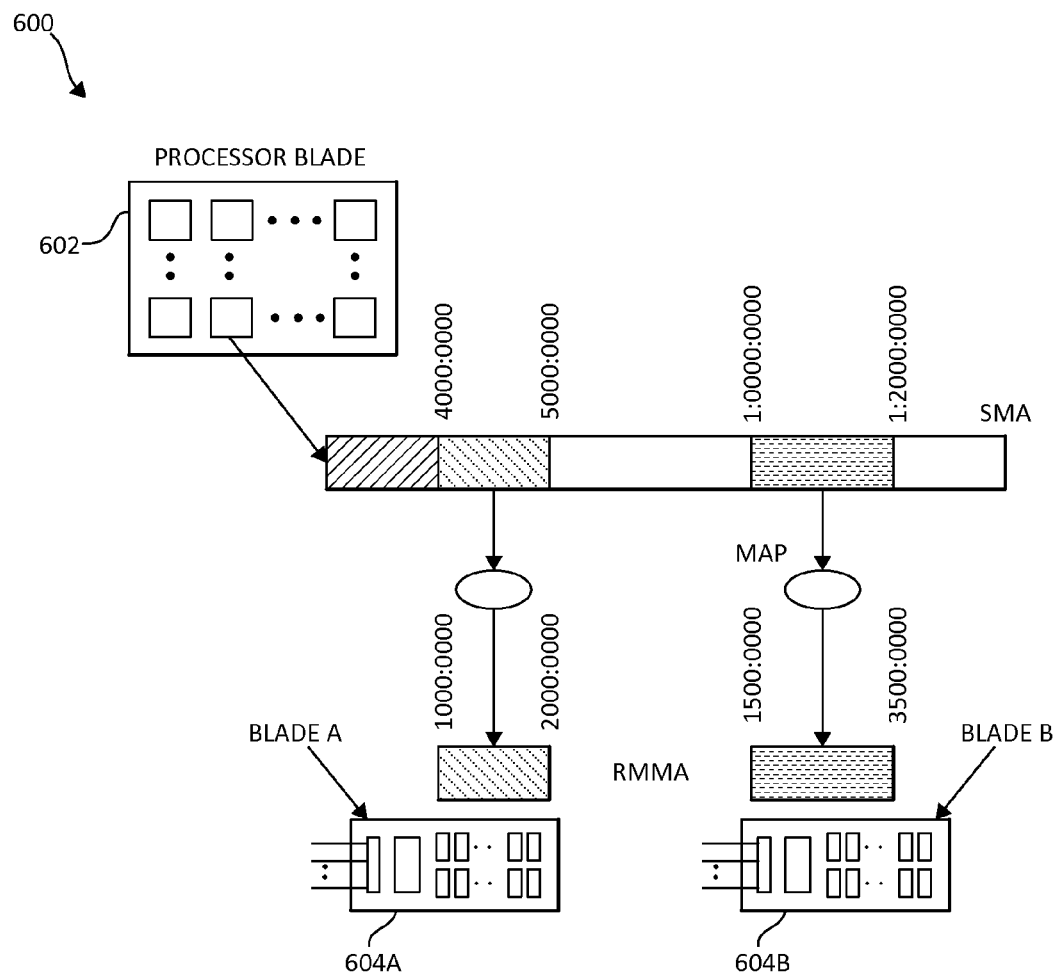
FIG. 6 is a block diagram illustrating a hardware structure for consolidation of system memories based on a switching fabric in which aspects of the present invention may be realized.

FIG. 6 is an exemplary block diagram 600 showing a hardware structure for consolidation of system memories based on a switching fabric in a computer system. FIG. 6 shows the mapping of SMA space to RMMA space. At a particular instance, a processor 602 holds 1 gigabyte (GB) of remote memory in blade A 602A (1000:0000-20000:0000), which is mapped to SMA space 4000:0000-5000:0000. Now, the same processor receives 2 GB of data from the blade B 604B, which is switched to that processor. The processor maps the RMMA space (1500:0000-3500:0000) to the SMA space in the range 1:0000:0000-1:2000:0000. Note that the ranges of RMMA are overlapping; however, they are distinguished at the processor side based on the channel identification (ID) (and/or blade Id). When a remote memory superpage is read into the local memory, the superpage still resides on the memory blade 604. Removing the superpage will allow for the reuse of the memory space. If the superpage is deleted upon a read operation, the same superpage should always be written back onto the remote memory while evicted from the local memory. On the other hand, keeping the superpage on the remote memory may enable the system to simply evict the page if it is not dirty, thus saving the back pressure on the optical channel bandwidth; in case of a dirty page, only the changed portion can be sent to the memory using a delta coding. Thus, the decision to remove or keep a remote memory superpage depends on the update pattern of the superpage.

Figure 7:
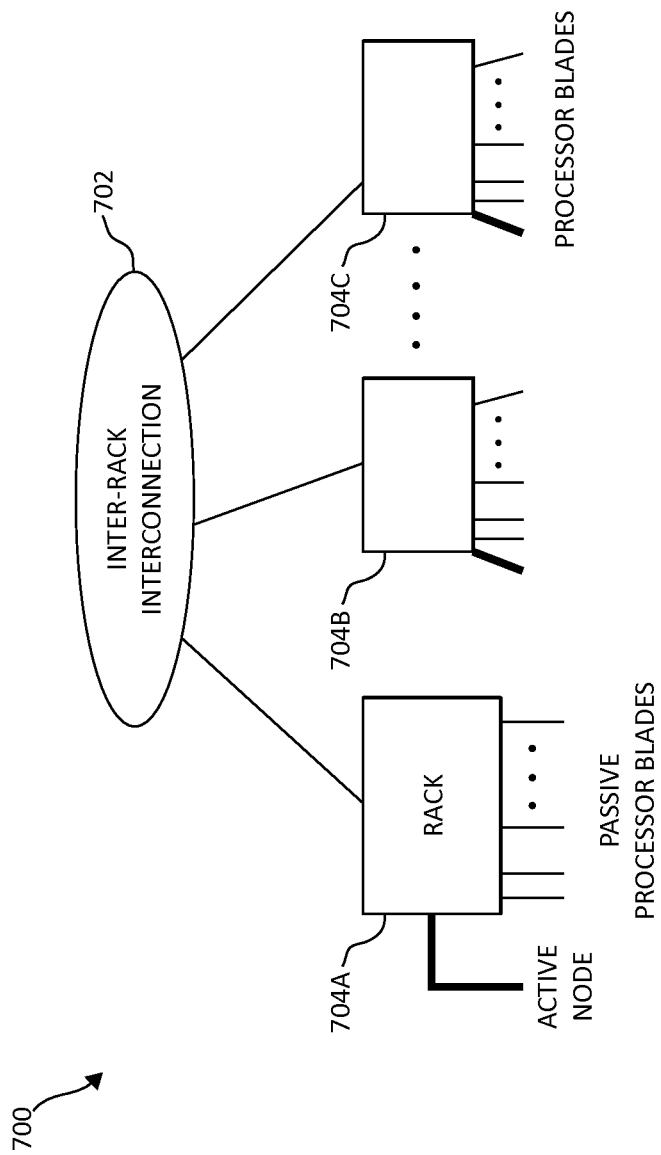
FIG. 7 is a block diagram illustrating a hardware structure for interconnection networks for the memory switching system in which aspects of the present invention may be realized.

Turning now to FIG. 7, an exemplary block diagram 700 showing a hardware structure for interconnection networks for the memory switching system is illustrated. The processor nodes are connected to the intra-rack (edge) switches. Though all the processor nodes have optical links to the remote memory racks, only the active nodes can switch memory across the racks. Active processor nodes are connected to the edge-level switches within the processor racks. Compared to the passive processor nodes, the active processor nodes have higher link-bandwidth. For example, consider only one level of memory switching between active nodes. Such a design limits the complexity of the optical switching fabric and aims at reducing the burden on inter-rack (core and aggregation) switches. The passive nodes transfer data and destination information to the active nodes, which carry out the high volume data transfer across racks by switching memory. The tiny data transfers across the racks proceed through the electrical inter-rack interconnection, which is highly oversubscribed and has very low bi-section bandwidth. These loads of the electrical links are basically attributed to the meta-data or critical data. (In a parallel system, the critical data/blocks are sent to the receiving processor to reduce the stall time of the pipeline). The active nodes connect to the edge switch through a link that has larger bandwidth than the ones corresponding to passive nodes. Each of the active nodes has multiple optical channels that connect the node to the remote switchable memories.

Having outlined the details of the system, a switching protocol that transfers a volume of remote memory address space from one processor to another processor is used. At the source (i.e., the sending active node) side, the active node collects or gathers data from the passive nodes and arranges and stores data according to the destination nodes and racks. To switch memory space to a remote active node, the sender node extracts the data format and the RMMA details (ranges and remote memory blade id/address), composes the metadata, and sends the metadata to the destination active node. The source node unmaps the remote RMMA space. Such an unmapping operation removes all the entries in the page tables mapping the linear address to the remote RMMA space; thus, the relevant SMA space that can be associated with different RMMA space is free. Such operation sequences are similar to those with memory deallocations. The difference is that such mapping and unmapping operations only maintain the page tables and data structures (e.g., buddy tree) to do the SMA-RMMA mapping, and manage the free segments (unmapped) within the SMA space; the actual physical allocation/deallocation is managed at the memory blade/rack side. The unmapping operation invalidates the cache and also cleans up the TLB. The source node tears down (e.g., disconnects) the circuit to the remote memory blade if the circuit is no longer necessary. At the receiving side, the active node receives the metadata and grafts the extra memory (i.e., supplied RMMA) into the mapping tables, emulating the process of memory allocation at the processor side. If a circuit with the remote memory blade does not already exists, the active node then sets up the circuit with the remote memory blade. The active node now reads the remote data and sends the data to the passive processor nodes via an intra-rack/edge switch. The remote data at the RMMA space keeps within itself the routing information (e.g., destination node) for different portions of data. Upon transmission of all the data in the received RMMA space, the active node either deallocates (relinquishing to the memory manager at the memory blades) or reuses the memory (filling with newly arriving data for subsequent memory switching.)

In one embodiment, at least two communication patterns—all-to-all personalized communication and all-to-all/ one-to all broadcast—that are the performance critical patterns in any large-scale parallel system is supported. The illustrated embodiments support these communication patterns using optical memory switching in a large-scale system. Such communication patterns are widely observed in a large number of scientific and database applications.

In all-to-all personalized (AAP) communication, each of the processors send distinct data to each of the remaining processors in the system. Such patterns (e.g., for example as used in torus and mesh networks) are often used in matrix or array transposition or parallel Fast Fourier Transform (FFT) operations. Support for more than one of the communication pattern operations (e.g., all-to-all communication pattern) with memory switching is provided.

As illustrated above in FIG. 7, the active nodes gather or collect data from the processors, and write the data onto the remote memory. The channels of an active node are divided into two classes: Switch-in and Switch-out channels. Switch-in and switch-out channels correspond, respectively, to the destination (receiver) and source (sender) side of a memory switching operation. This allows simultaneous data transmission and reception at an active node. The active nodes (or racks) 704 (shown in the drawings as 704a-c) in a ring structure are logically organized and a unique number k (0≤k<Na) is assigned, where Na is the number of racks (active nodes) 704 in the system. In an ith iteration, processors in a rack 704 send data for the processors lying in rack (k+i) % Na. Each active node gathers data from the processors within its rack 704 and writes the data to remote switchable memory (using switch-out channels).

Figure 8:
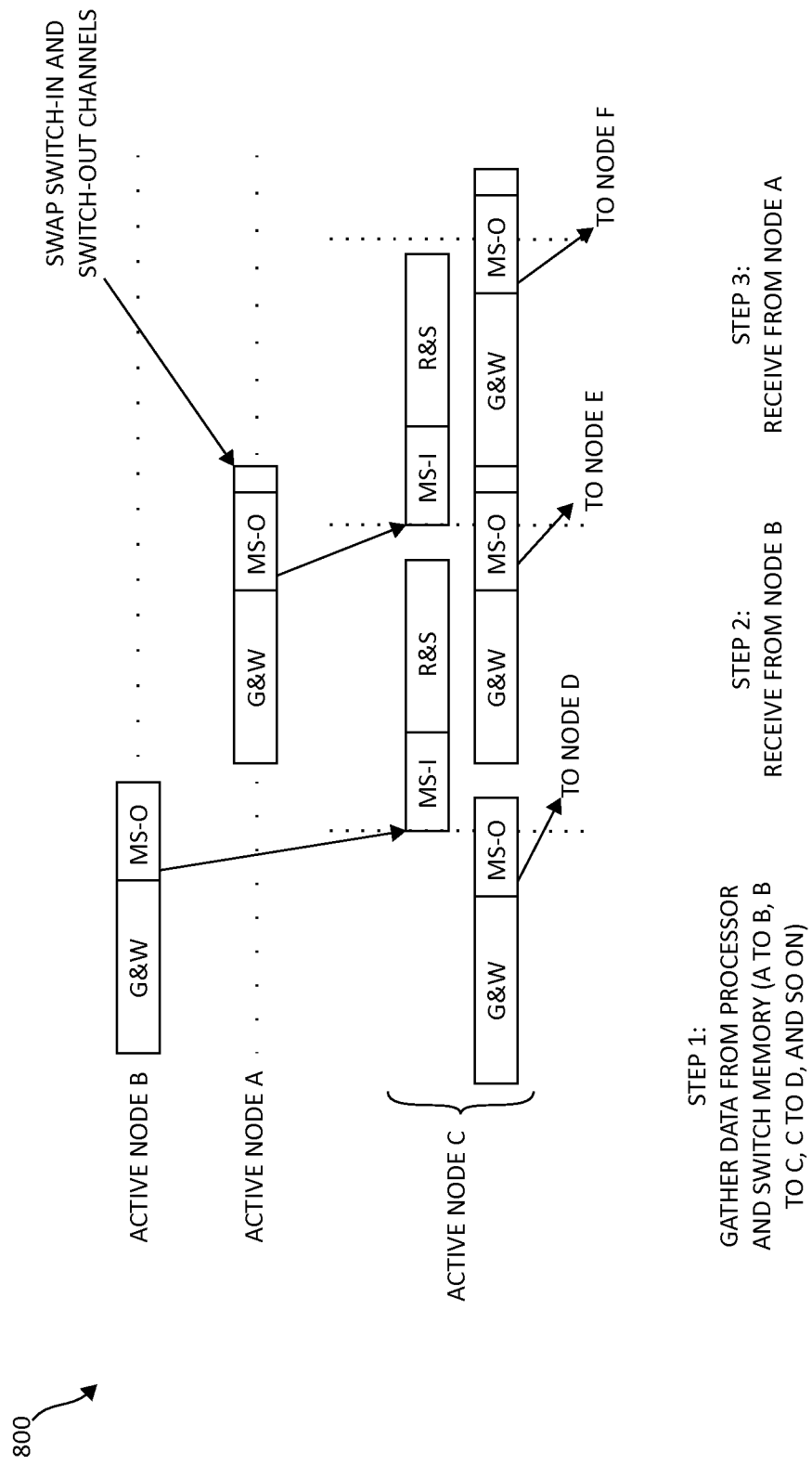
FIG. 8 is a block diagram illustrating a hardware structure of an all-to-all communication phase in optically switched systems in which aspects of the present invention may be realized.

Turning now to FIG. 8, an exemplary block diagram 800 showing a block diagram of an all-to-all communication phase in optically switched systems is depicted. Each processor in the all-to-all communication phase in the optically switched system sends different data to different processors. In each step, each active node collects data for a destination rack and stores it in memory; an active node can overlap the sending of the receiving data by maintaining two separate sets of channels. FIG. 8 illustrates various iterations in an active node C during an all-to-all communication phase. In a particular iteration, an active node performs the following operations: step 1—MS-I Memory switch-in, step 2—R&S Read (using switch-in channel) and send (to the processors), step 3—MS-O Memory switch-out, and step 4—G&W Gather (from in-rack processors) and Write (using switch-out channels). In a particular iteration, an active node may perform the following operations: step 1: gather data from processors, a switch memory (A to B, B to C, C to D, etc.), step 2: Receive from node B, and step 3: receive from node A. For example, in iteration 2, an active node C does switch-in operation (MS-I) that sets up circuits to the remote memory blades (supplied by a sender) using switch-in channels. The active node then (in R&S operation) reads the supplied memory space and sends to the in-rack processors using the intra-rack network switch. Concurrently, along with the above operations, node C gathers data from the processors and stores in the remote memory using switch-out channels. The node C initiates the switch-out operation (MS-O) and signals the destination node (E) regarding the memory switching operation. Note that, at the end of the switch-out operation, the switch-out channels tear down (e.g., disconnect) the circuits and hold no memory space. Also, at the end of the iteration, the switch-in channels hold memory space that will no longer be used by the active node, as the data from the memory space has already been sent to the processors. So, the active node can reuse the memory space in the G&W operation during the subsequent iteration 3. Therefore, immediately after the memory switch-out (MS-O) operation, the node C swaps the channels, reversing the role of the switch-out and switch-in channels. Such a channel swapping reduces the memory and channel allocation overheads during an AAP communication phase. The total time of an AAP communication phase as described above can be approximated as $$T_{AAP}(N_a) \approx N_a \max(T_{MS\text{-}I} + T_{R\&S}, T_{MS\text{-}O} + T_{G\&W}) \quad (1)$$

Here, assuming an upper bound N'p/Ni on the data imbalance across the participating processor nodes (N'p); data imbalance is expressed as the ratio of maximum and minimum data volume transferred to/from a participating processor node (edge link) in the rack. TX is the total time for operation X(X=MS-I,MS-O,R&S,G&W), and Boc and Be are the Bandwidth of an optical channel and a link in edge switch, respectively. Ni is the total links (ports) connected to an active node i. The ratio of maximum and minimum data volume transferred to/from a participating processor node (edge link) in the rack is shown as:

$$T_{R\&S} \approx (S_{data})/\min(n_{ms\text{-}i}B_{oc}, N_iB_e) \quad (2)$$

$$T_{G\&W} \approx (S_{data})/\min(n_{ms\text{-}o}B_{oc}, N_iB_e) \quad (3)$$

Here, nms-i, nms-o is the total switch-in and switch-out channels, respectively. Sdata is the total data transfer volume (in a phase of AAP/AAB). nproc is the total processors corresponding to a processor blade/node. Binter is the total aggregate bandwidth of inter-rack interconnection (core and/or aggregation switches).

Figure 9:
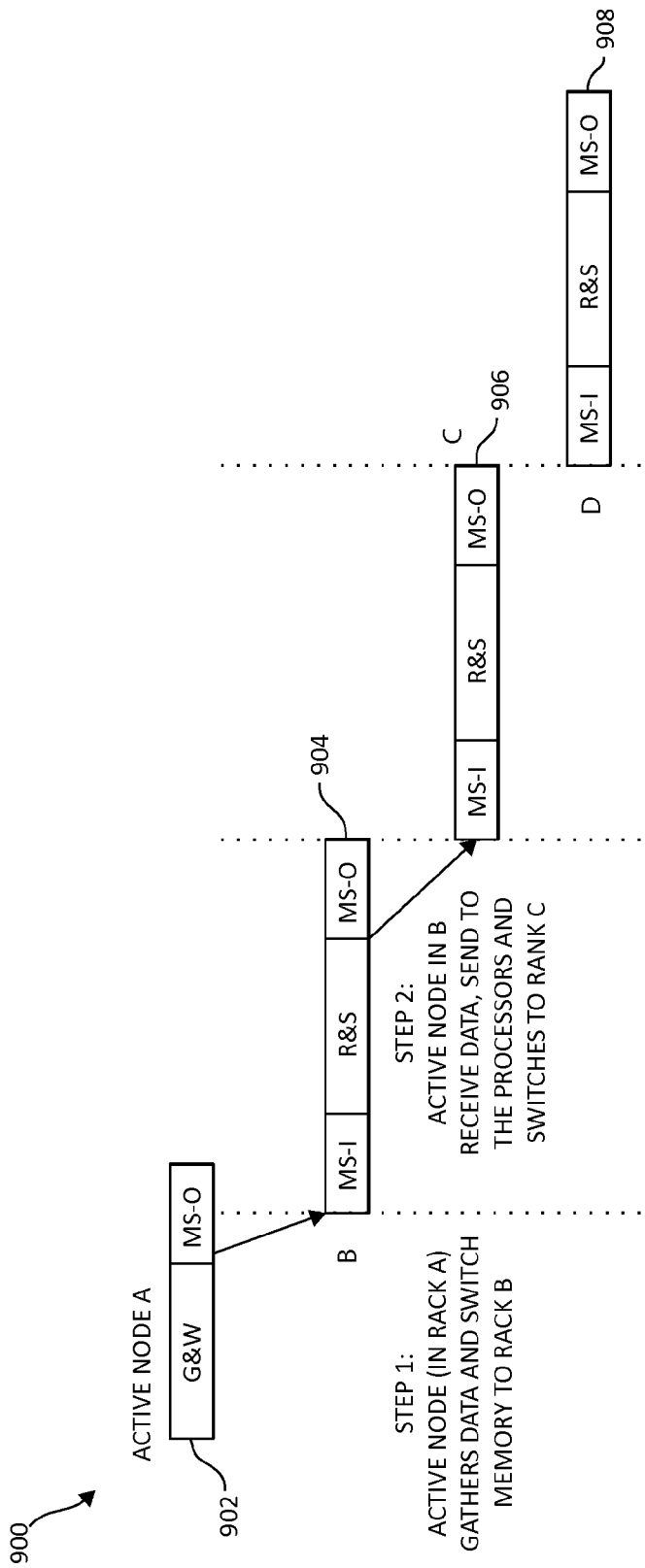
FIG. 9 is a flow chart diagram illustrating an exemplary method for an optically-created memory (OCM) system.

Turning now to FIG. 9, an exemplary block diagram 900 showing data broadcast in an optically switched memory system is illustrated. Each node sends the same data to other processors. The active nodes switch the memory after reading the data (and sending to the edge-level processor nodes) foregoing any memory write and/or gathering. In step 1, the active node (in rack A) 902 gathers data and switches memory to rack B 904. In step 2, active nodes in B 904 receive data and send the data to processors and switches to rack C 906 and 908.

As mentioned above, FIG. 10 is an exemplary table diagram 1000 showing the notations and corresponding system parameters for the memory switching operations. TX is the total time for operation X(X=MS-I,MS-O,R&S,G&W); Boc and Be are the Bandwidth of an optical channel and a link in edge switch, respectively. Ni is the total links (ports) connected to an active node i. Np is the total passive processor blades/nodes connected to an edge switch (Np>>Ni). nms-i, nms-o is the total switch-in and switch-out channels, respectively. Sdata is the total data transfer volume (in a phase of AAP/AAB). nproc is the total processors corresponding to a processor blade/node. Binter is the total aggregate bandwidth of inter-rack interconnection (core and/or aggregation switches).

Figure 11A:
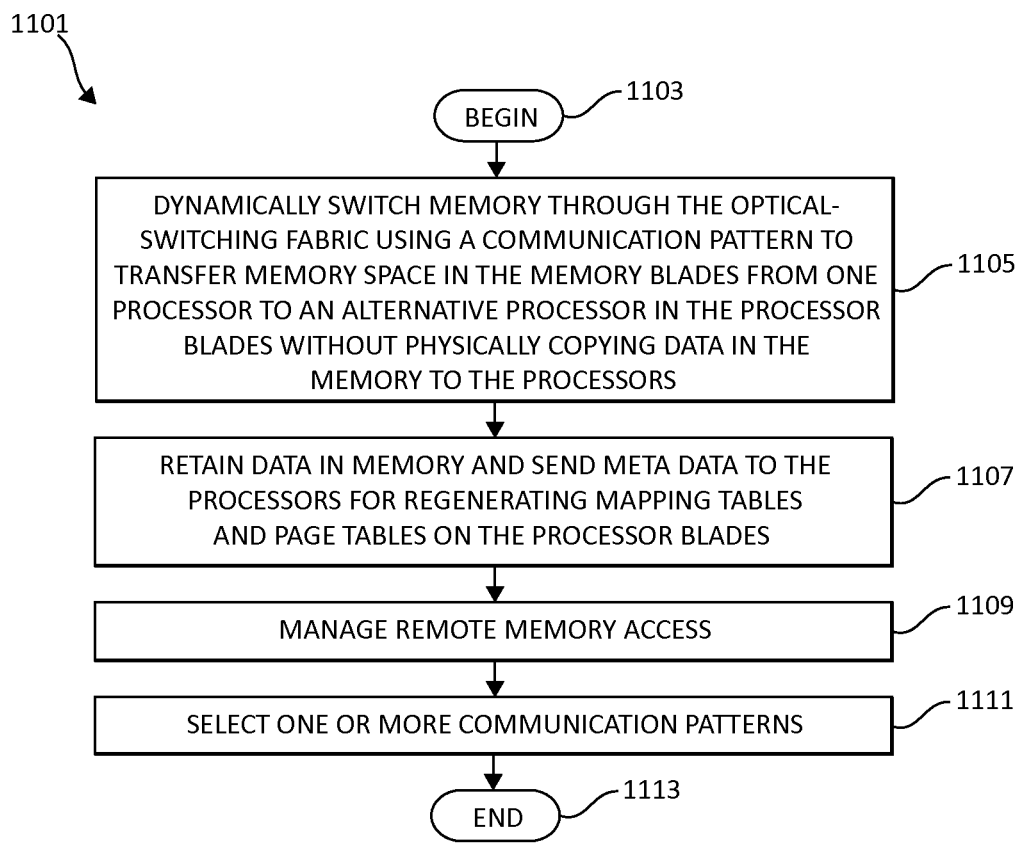
FIG. 11A is a flow chart diagram illustrating an exemplary method for memory switching in an optically-created memory (OCM) system.

The previously discussed embodiments are illustrated in FIG. 11. FIG. 11A is a flow chart diagram illustrating an exemplary method 1101 for memory switching in an optically-created memory (OCM) system. The method 1101 begins (step 1103) by dynamically switching memory through the optical-switching fabric using a communication pattern (multiple communication patterns to transfer a memory space in the memory blades from one processor to an alternative processor in the processor blades without physically copying data in the memory to the processors (step 1105). The memory is dynamically switched through optical-switches to transfer a physical memory space in the memory blades from one processor in the processor blades to another processor in the processor blades without physically moving (for example copying) the data in the memory to the processors. The protocol for transferring physical memory space (e.g. a region of memory in the memory blades) from one processor to another tears down (e.g., disconnects) a RMMA space in the sending processor and grafts (e.g., joins and/or unites) the RMMA space to a selected region of the SMA space. This allows for simultaneous memory consolidation and data transfer, both being the vital and widely used operations in a virtualized environment (e.g., a data center). Data is retained in the memory and metadata is sent to the processors for regenerating mapping tables and page tables on the processor blades (step 1107). The method 1100 manages remote memory access (step 1109) and may select one or more communication patterns among the processors (e.g., all-to-all communication patterns) to transfer a memory space in the memory blades from one of processors to another processor in the processor blades without physically copying data in the memory to the processors (step 1111). The method 1100 ends (step 1113).

Figure 11B:
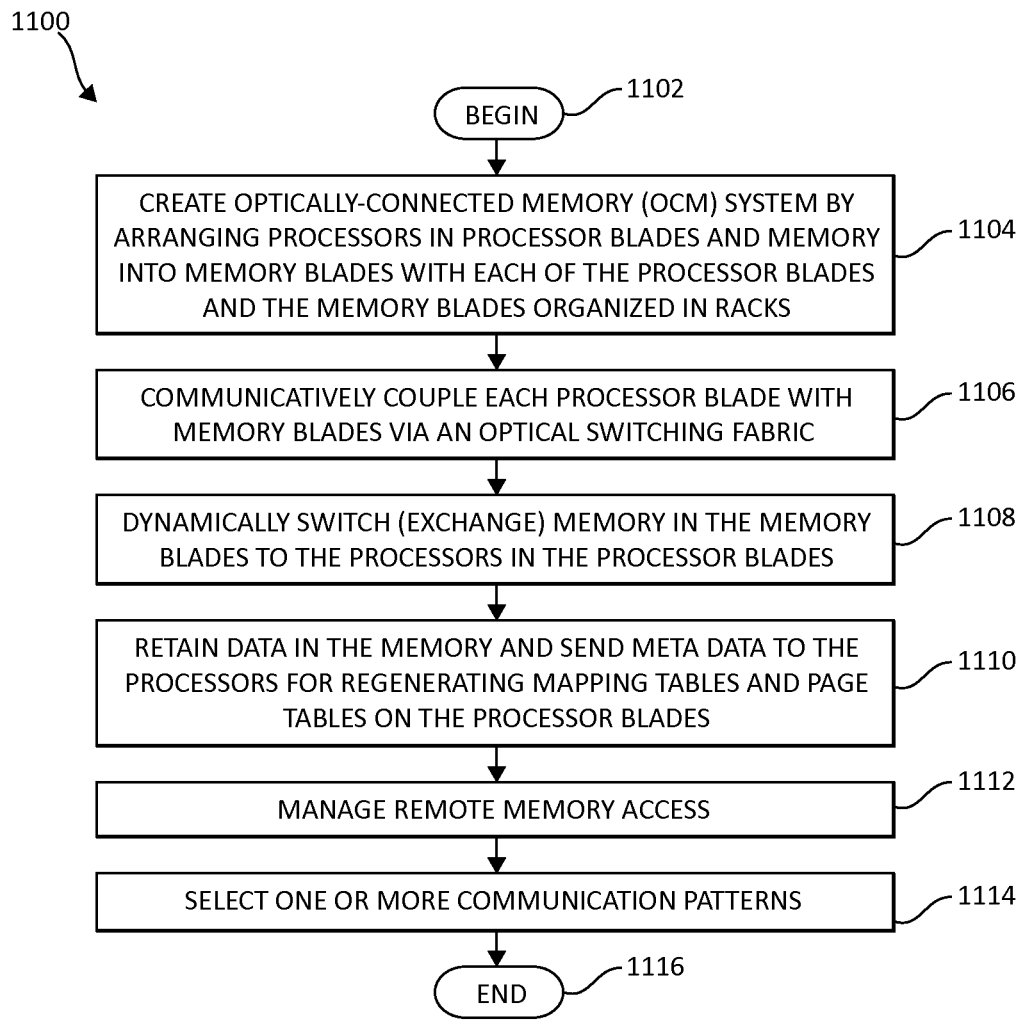
FIG. 11B is a flow chart diagram illustrating an exemplary method of manufacturing a system for memory switching in an optically-created memory (OCM) system.

FIG. 11B is a flow chart diagram illustrating an exemplary method of manufacturing 1100 a system for memory switching in an optically-created memory (OCM) system. The method 1100 begins (step 1102) by creating optically-connected memory (OCM) system by arranging processors in processor blades and memory into memory blades with each of the processor blades and the memory blades organized in racks (step 1104). The method 1100 communicatively couples each processor blade with memory blades via an optical switching fabric (step 1106). The method 1100 dynamically switches (exchanges) memory in the memory blades to the processors in the processor blades (step 1108). As mentioned above, the memory is dynamically switched through the optical-switches to transfer a physical memory space in the memory blades from one processor in the processor blades to another processor in the processor blades without physically moving (for example copying) the data in the memory to the processors. The protocol for transferring physical memory space (e.g. a region of memory in the memory blades) from one processor to another tears down (e.g., disconnects) a RMMA space in the sending processor and grafts (e.g., joins and/or unites) the RMMA space to a selected region of the SMA space. This allows for simultaneous memory consolidation and data transfer, both being the vital and widely used operations in a virtualized environment (e.g., a data center). Data is retained in the memory and metadata is sent to the processors for regenerating mapping tables and page tables on the processor blades (step 1110). The method 1100 manages remote memory access (step 1112) and may select one or more communication patterns among the processors (e.g., all-to-all communication patterns) to transfer a memory space in the memory blades from one of processors to another processor in the processor blades without physically copying data in the memory to the processors (step 1114). The method 1100 ends (step 1118). In one embodiment, the memory switching protocol increases the holistic system performance by mapping the memory consolidation and the data transfer to a memory switching protocol, which does not require any significant physical data movement over the network (the size of the metadata sent by the protocol may be very small, e.g., a few kilobytes "KB").

In one embodiment, all-to-All broadcast (AAB) communication pattern is supported. In the AAB communication pattern, each processor sends the same data to all other processors. Large-scale parallelization of applications, such as correlation detection in multimedia data and non-equijoins among large volume database tables, should broadcast data across all the participating processors in the system. For example, computing correlation across two video or image streams requires, similar to any high-dimensional data, each incoming frame or image within a stream to be compared against almost all the frames or images in the other stream. Thus, the incoming data should be broadcast to all the participating processors. The protocol for broadcast communication with memory switching is similar to that of all-to-all communication. In a broadcast communication phase, as shown in FIG. 8, an active node gathers data from the processor nodes and stores in the remote memory (G&W) through switch-out channels. The active node (A) then switches the memory space to adjacent active node (B), which then reads the data and sends to the processor nodes within its rack. Now, the active node B switches out the memory space to node C without invoking any G&W. Thus, in broadcast communication each active node can switch out the memory without incurring any G&W operation within a particular step. Note that, in case of a broadcast, the usage of switch-out and switch-in channels does not overlap in time; thus, a broadcast phase can proceed in two directions (along the ring) halting when the two sequences of memory switchings meet at an active node. The total time of an AAB communication phase can be approximated as $$TAAB(Na)=Na\ max(TMS\text{-}I+TR\&S+TMS\text{-}O) \quad (4)$$

(See Table 1 in FIG. 10 for the notation descriptions and parameters and it should be noted that for simplicity of the model, and by way of example only, pipelining the MS-O with R&S operation is not considered.) The AAP and AAB protocols, as stated above, can easily be adapted to support many-to-many/one-to-many personalized or broadcast communication. In such a scenario, the original active node (that initiates a communication phase), while switching memory to its neighboring node, can provide the list of nodes with the metadata; the intermediate nodes switch memory to the subsequent nodes in the list and keep on sending the updated list accordingly. To allow maximal parallel memory switching among the active nodes, each active node initiating a communication phase can shuffle the destination nodes randomly before sending to the first destination node (selected from the shuffled list).

Based upon the foregoing embodiments, the following model applications are illustrated by presenting two representative applications from scientific and database domains that use the communication patterns described above. Upon execution of the two representative applications from scientific and database domains that use the communication patterns, the execution details in the two level interconnection systems, as described in FIG. 7, are presented, where each processor blade corresponds to a number of processors (nproc).

Figure 12:
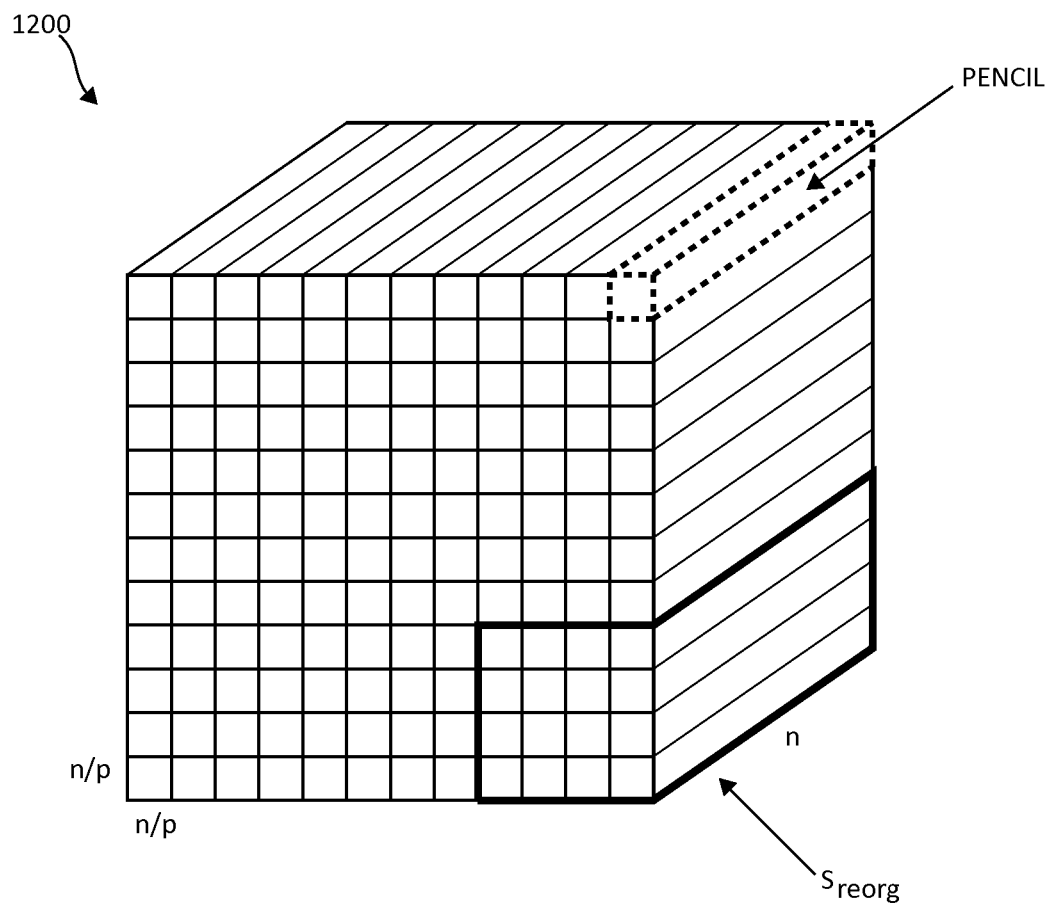
FIG. 12 is a block diagram illustrating pencil-based data partitioning for computing three-dimensional Fast Fourier Transform (FFT)

In one embodiment, the three-dimensional Fast Fourier Transform (FFT) is applied where the data is represented as points in a three dimensional cube with data size N=n×n×n points. The three dimensional FFT is computed by computing $n^2$ 1 dimensional (1D) FFTs, one for each row of n elements, along each of the three dimensions. Due to scalability bottlenecks, a pencil method that divides two of the three dimensions of a data cube and allocates the elements across the processors (P=p×p) is used, as shown in FIG. 12. FIG. 12 is an exemplary block diagram illustrating the pencil-based data partitioning for computing three-dimensional Fast Fourier Transform (FFT). Such a partitioning gives each processor (nip)×(nip)×n elements. Now $n^2$ 1D FFTs can be computed locally only along one dimension; and the data should be reorganized in two steps to render the data locally contiguous along two other dimensions. Each of the reorganization stages requires AAP communications across a group of processors. During the reorganization stage, each processor distributes data to p processors. Therefore, the number of active nodes participating in an AAP communication (NAAP) and total data transfer from each active node in each reorganization stage (Sreorg) can be given as, $$N_{AAP}=[n_{proc}N_p] \quad (5)$$

$$S_{reorg}=n_{proc}N_pS_{pencil} \quad (6)$$

(See Table 1 in FIG. 10 for the notation descriptions and parameters). Therefore, during the reorganization stage, total data transfer (through memory switching) within each step of the AAP communication phase (c.f., FIG. 8) can be given as, $$Sswitch \approx (Sreorg/NAAP) \quad (7)$$

(See Table 1 in FIG. 10 for the notation descriptions and parameters). Note that there are a large number of simultaneous AAP communications among groups of racks, the size of each group is NAAP as given in Equation 5; the total number of such groups is also NAAP. Depending on the maximum allowable switching memory size Mmax, there might be [Sreorg/NAAPMmax] number of AAP communication phases within each reorganization stage. Thus, in the execution model, the data is reorganized in a piecemeal fashion pipelined (or overlapping) with the computations. The total communication and computation time can be written as, $$Tcomm \approx 2 \lceil Sreorg/NAAPMmax \rceil TAAP(NAAP) \qquad (8)$$

$$Tcomp \approx 3Kt_c N \log 2N \qquad (9)$$

Here, TAAP (NAAP) is the total time of an AAP communication phase with group size NAAP, as given in Equation 1, $t_c$ is execution time per instruction, and K is a constant that we determine observing the processor time of the FFT computation with varying data size and using a curve fitting operation.

When processing videos, images, and/or other data over a large number of processing nodes, the data elements (video frames, images, tuples etc.) are collected at a number of sinks and distributed across the processing nodes. The whole data set is partitioned across the nodes that store one or more partitions of the data. In one embodiment, an application for joining two large tables; R and S, over a number of compute nodes may be utilized, where each compute node hosts 32 processor cores. Such an application is suitable for memory switching without data gathering. Here, two tables are equally partitioned among the compute nodes, and each compute node stores one partition from each table; one of the two tables (say, R) is stationary, as its partitions are pinned to the respective compute nodes, while the other table (say, S) is mobile, as the respective partitions circulates across the compute nodes. At the onset of the join processing, each node locally processes the join results. Upon processing the local data partitions, each compute node transfers its partition of the table S to the adjacent compute node arranged in a ring structure; so, each compute node receives a new partition of table S, and joins it with the locally stored partition of table R. This data transfer and local computation are carried out in stages until each of the partitions of table S is circulated among all the compute nodes; the number of such stages is equal to the total compute nodes participating in the join processing task. In such an organization, the communication pattern is all to all broadcast (AAB) as described in subsection 4.2.

As illustrated below, the switching memory is applied and experimental results on switching memory are demonstrated. The feasibility results of the switching memory (with optical fabric) are illustrated in two scenarios—gathering and non-gathering. In case of memory gathering, data is written to a different memory space through a separate optical channel before being switched to a remote node. In non-gathering scenario, data is transferred to a remote node without using any intermediate memory space or optical channels. The illustrated embodiments may apply two applications: joining tables and 3D-FFT. The former one uses the non-gathering based switching of memory, whereas the 3D-FFT uses the gathering-based data transfer across the processor nodes. For each of the applications, the system equipped with optically switched memory is compared with a system where the compute nodes communicate through an electrical switch. The default link bandwidth of such an electrical switch is 10 Gbps.

Figure 13A:
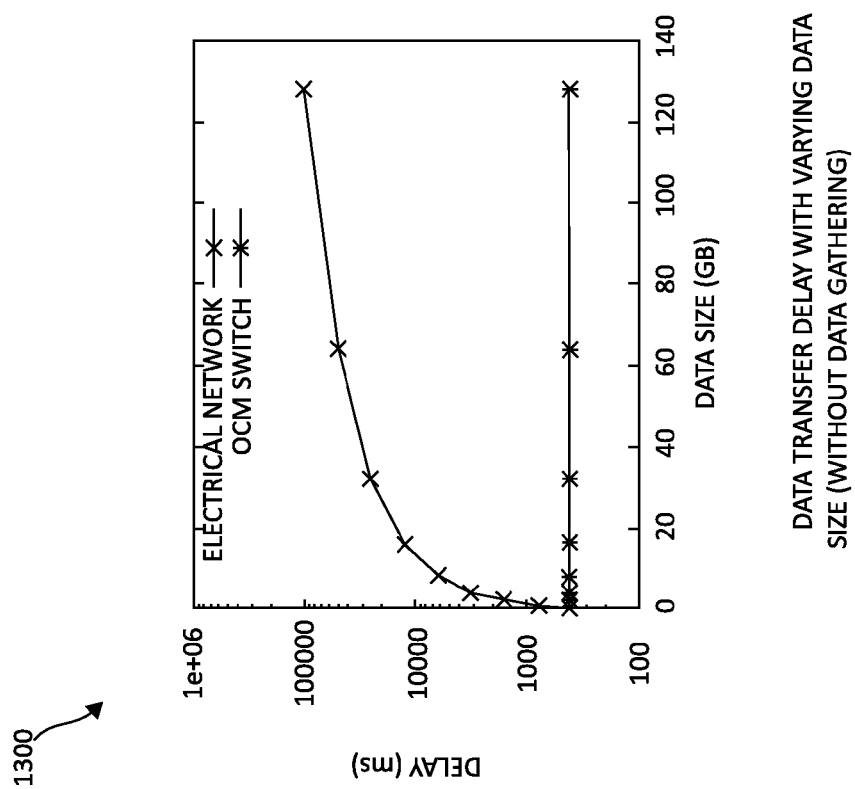
FIG. 13 is a graph chart diagram illustrating data transfer delay with varying data size (without and with data gathering)
Figure 13B:
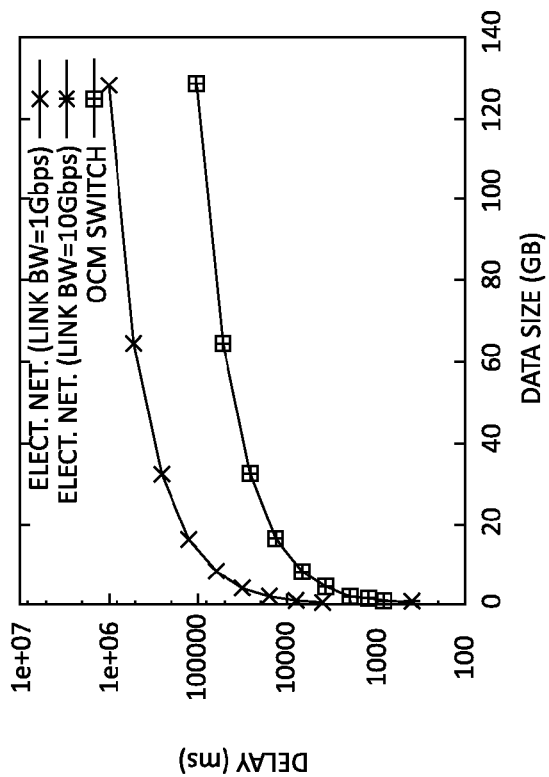

The following parameters are applied for an optical switch: optical to electrical or electrical to optical conversion time 15 nanoseconds (ns), optical switching latency 10 milliseconds (ms), optical fiber length 40 meters. As for electrical communication, an ethernet switch with per-switch latency 4 µs (microseconds) may be used. The optical switch connects a number of compute nodes (blades) with memory blades, and each compute node hosts 32 processor cores. Turning now to FIG. 13A and 13B, FIG. 13A is a graph chart diagram 1300 illustrating data transfer delay with varying data size (without data gathering) and FIG. 13B is a graph chart diagram illustrating data transfer delay with varying data size (with data gathering). The delays are compared while transferring data using optically connected memory switching. The electrical switch shows the notations and corresponding system parameters for the memory switching operations and shows the delay in transferring data across the compute nodes over an electrical switch using a (non-gathering) memory switching operation. The delay with optically connected memory (OCM) switching is independent of the transfer size. By using the electrical switches, the delay increases with data size. It should be noted that, contrary to data transfer with electrical switches, the memory switching embodiments do not incur any overhead in allocating memory space at the remote node; such overhead is ignored (which favors the electrical switches.) Thus, with memory switching, the processors can start to consume data instantly without incurring significant wait time. FIG. 13B shows the data communication delay while using gathering-based memory switching. In this scenario, given a bandwidth of 10 Gbps (which is also the bandwidth available at the optical channels), both the memory switching and the electrical network show almost equal delay. However, with a lower electrical network bandwidth, the delay in optical memory switching is significantly lower (note the log-scale along the y-axis) in comparison to that with the electrical network.

Figure 14:
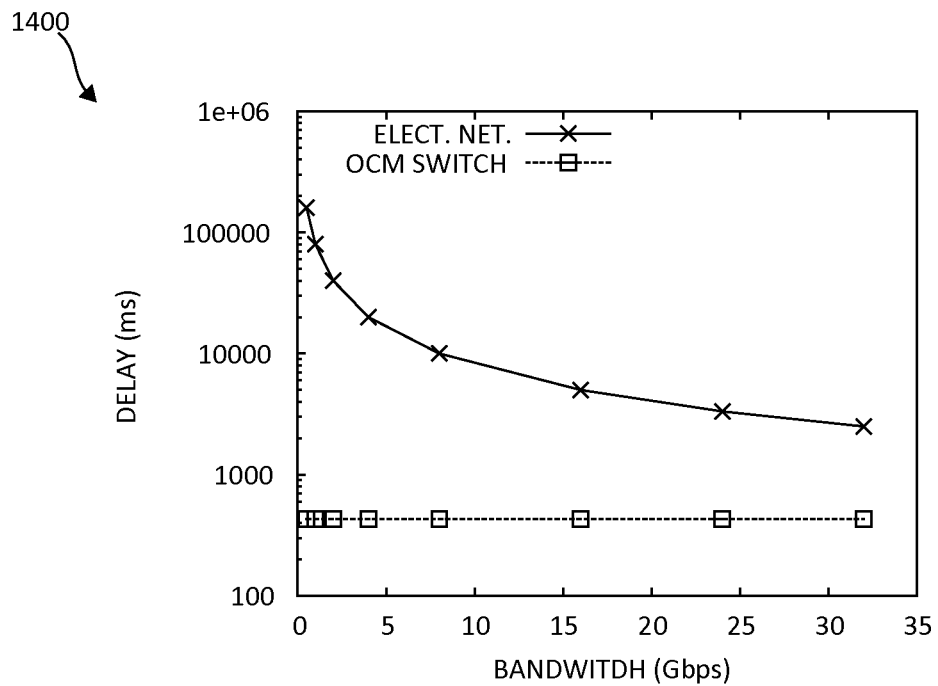
FIG. 14 is a graph chart diagram illustrating transfer delay with varying network bandwidth.
Figure 15:
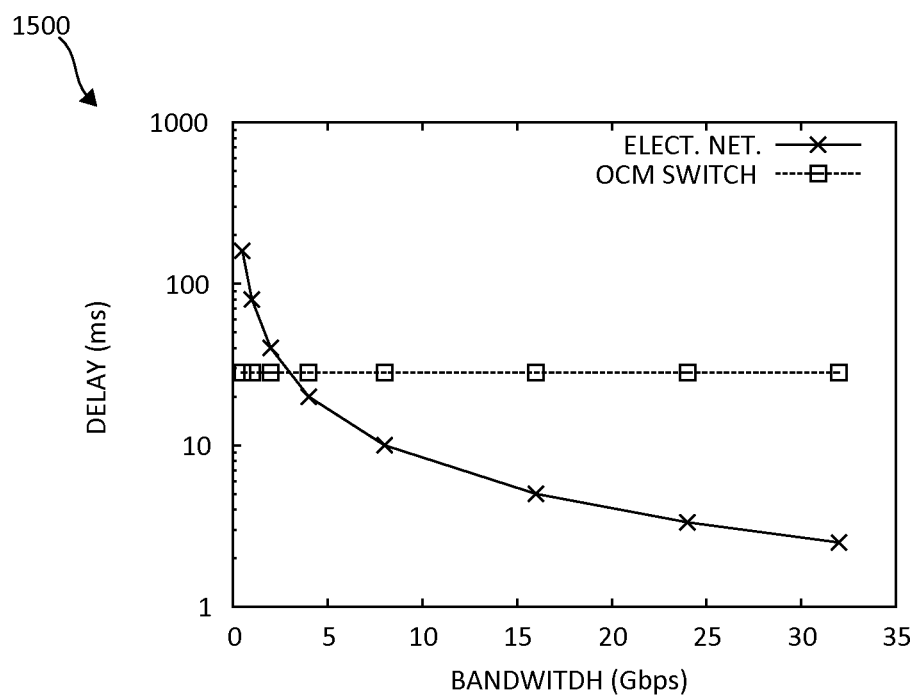
FIG. 15, is a graph chart diagram illustrating transfer delay with varying network bandwidth (data size=10 MB)

FIG. 14 is a graph chart diagram 1400 illustrating transfer delay with varying network bandwidth. The transfer delay with data size shows the effect of varying bandwidth while transferring a fixed volume (10 GB) of data. As the electrical bandwidth increases, the corresponding delay also decreases. Turning now to FIG. 15, a graph chart diagram 1500 illustrating transfer delay with varying network bandwidth (data size=10 MB) is depicted. As observed in FIG. 15, for a small data volume (10 MB), there is a point beyond which the electrical network fares well. So, given an electrical network, all data transfers with sizes smaller than a certain threshold should follow the electrical link, otherwise the data could be switched across the compute nodes through memory switching.

In processing joins over large tables, each compute node receives data from only one compute node. Each of the nodes can proceed with the computation, without participating in any synchronization barrier involving multiple nodes, as soon as it receives data. As a node does not need to store the received data in a separate memory space, the node can do on the fly, pipelined processing on the data. For join processing, the system consists of a number of compute blades, each hosting 32 processor cores. This corresponds to a rack level topology, where each compute blade is an active node, and hence can switch memory directly to another compute blade. In one embodiment, by way of example only, the maximum switchable memory space (Mmax) may be set to 32 GB. The size of each elements in a table in taken as 64 Bytes.

Figure 16:
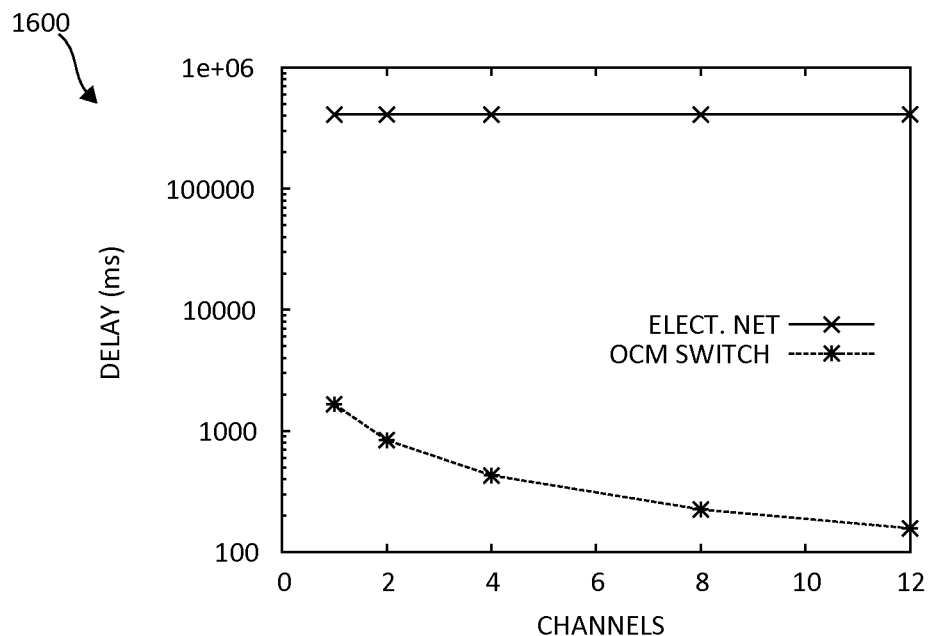
FIG. 16 is a graph chart diagram illustrating communication overhead with varying optical channels per active node (table size=billions)
Figure 17:
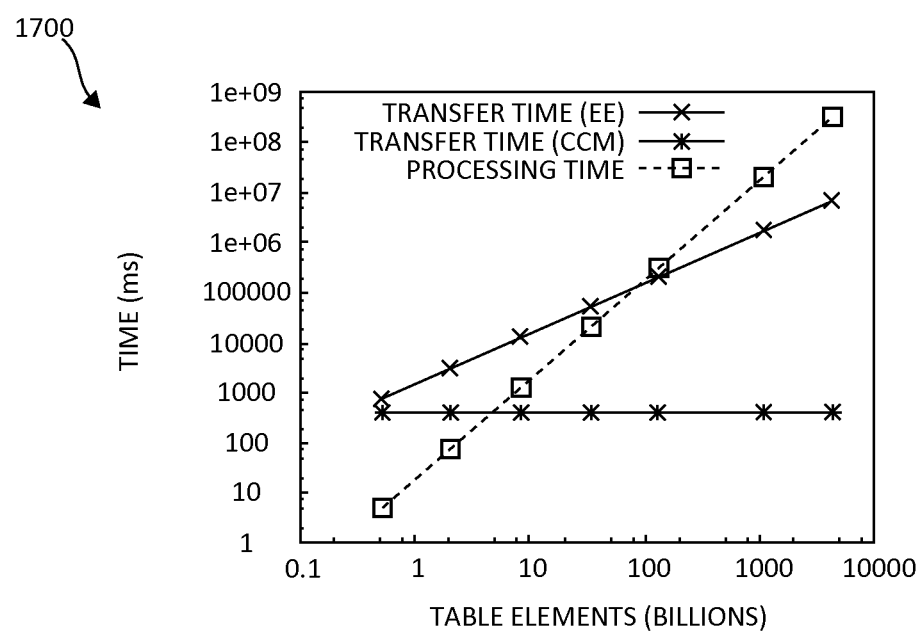
FIG. 17 is a graph chart diagram illustrating data communication time (overheard) with varying table size.

FIG. 16 is a graph chart diagram 1600 illustrating communication overhead with varying optical channels per active node (table size=billions). FIG. 16 shows the affect of using multiple optical channels within an active node (i.e., compute blade). The delay decreases linearly with the increase in the number of channels. FIG. 17 is a graph chart diagram 1700 illustrating data communication time (overhead) with varying table size. FIG. 17 presents the communication time (incurred within a processing stage) for two systems while processing joins with varying table sizes; here, the x-axis denotes the table size in billions of elements. The communication delay for the system with switchable memory is significantly lower than that with the system using an electrical switch. This demonstrates the effectiveness of switching memories using optical interconnection fabric. In such a single input, pipelined data processing, optically switched memory can transfer data to the end compute nodes instantly without incurring any overhead of reading and writing memory data and of memory allocation, and such a communication overhead is independent of the transfer size (c.f., FIG. 13A).

Figure 18:
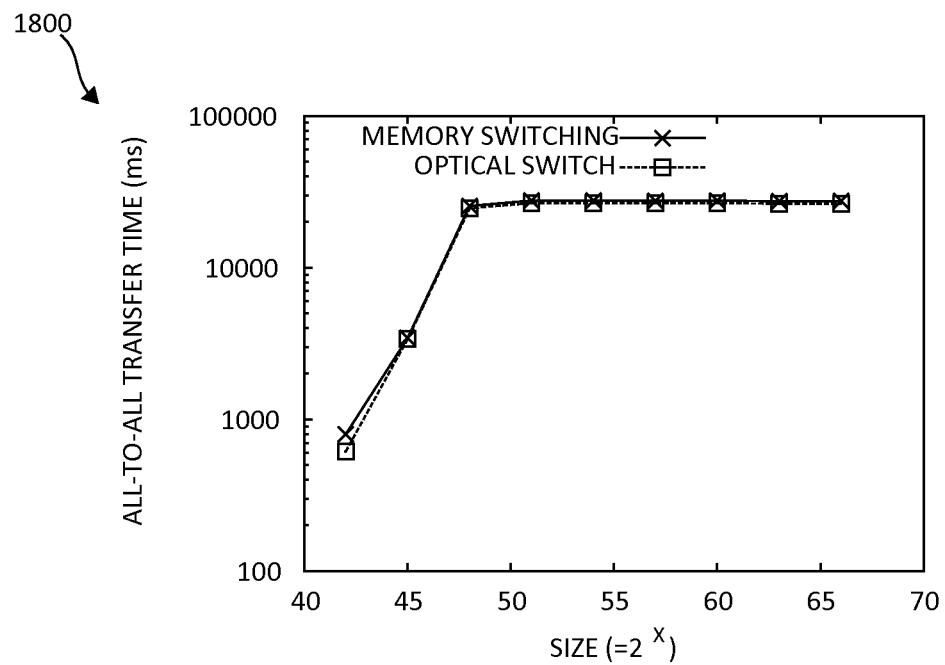
FIG. 18 is a graph chart diagram illustrating all-to-all (within a group) data transfer time with varying matrix sizes.
Figure 19:
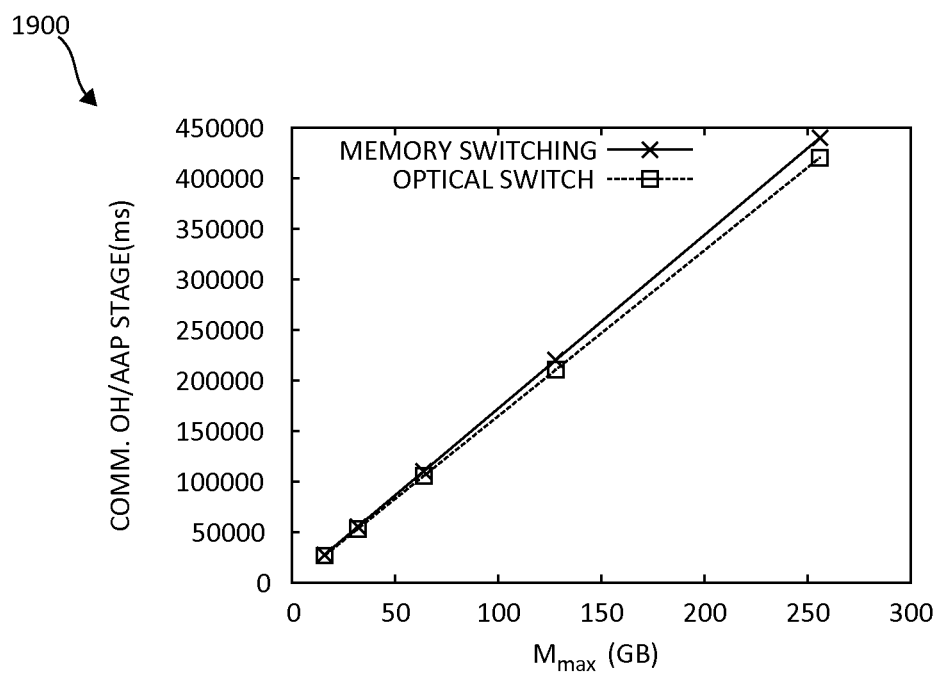
FIG. 19 is a graph chart diagram illustrating all-to-all (within a group) data transfer time with varying transfer (switching memory) size (GB)

In this subsection, the 3D-FFT applications that use the AAP communication pattern is used. Here, each processor receives data from a number of other processors during a reorganization stage (each of the reorganization stages consists of multiple AAP phases.) Data from the sending processors is gathered at an active node and switched to the receiving active node that sends the data to the respective processors. Therefore, in a system with switchable memories, such a scenario corresponds to memory switching with data gathering, and the data transfer involves synchronization barrier at each of the processing nodes. In one embodiment, by way of example only, a hierarchical model is configured with racks and blades: each blade hosts 32 processing cores, each rack contains 128 blades (passive nodes), and the whole system consists of 512 racks. In one embodiment, the default value of maximum switchable memory space (Mmax) is 32 GB. As a baseline system, one baseline system with optical (crossbar) interconnection among the top-of-rack (ToR) switches may be used, and memory switching performance across racks with the performance of that system may be compared. FIG. 18 is a graph chart diagram 1800 illustrating all-to-all (within a group) data transfer time with varying matrix sizes. FIG. 18 shows the delay in an AAP phase while processing 3D-FFT with varying matrix sizes. The saturation of delay (per AAP phase) is due to the fixed maximum switchable memory space Mmax: beyond a certain matrix size, total data volume that should be transferred in a reorganization stage exceeds Mmax, increasing the number of AAP phases within a reorganization stage. FIG. 19 is a graph chart diagram 1900 illustrating all-to-all (within a group) data transfer time with varying transfer (switching memory) size (GB). FIG. 19 shows the delay of an AAP Phase with varying maximum switchable memory size. As expected, the delay increases linearly with Mmax. However, the delay with memory switching is higher than that for the system with optical switches. This is due to extra memory write operations during data gathering at an active node. As such, applications having All-to-All communication patterns within a group of processors (lying across racks) locked into a synchronization barrier, switching memory might not be an efficient method of data transfer.

Figure 20:
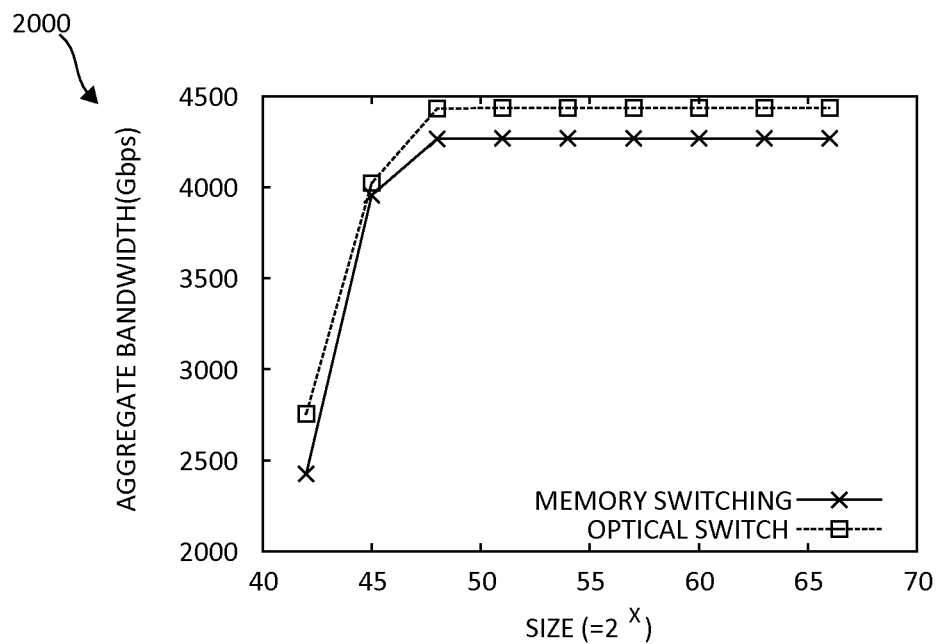
FIG. 20 is a graph chart diagram illustrating aggregate bandwidth across racks with increasing matrix sizes.
Figure 21:
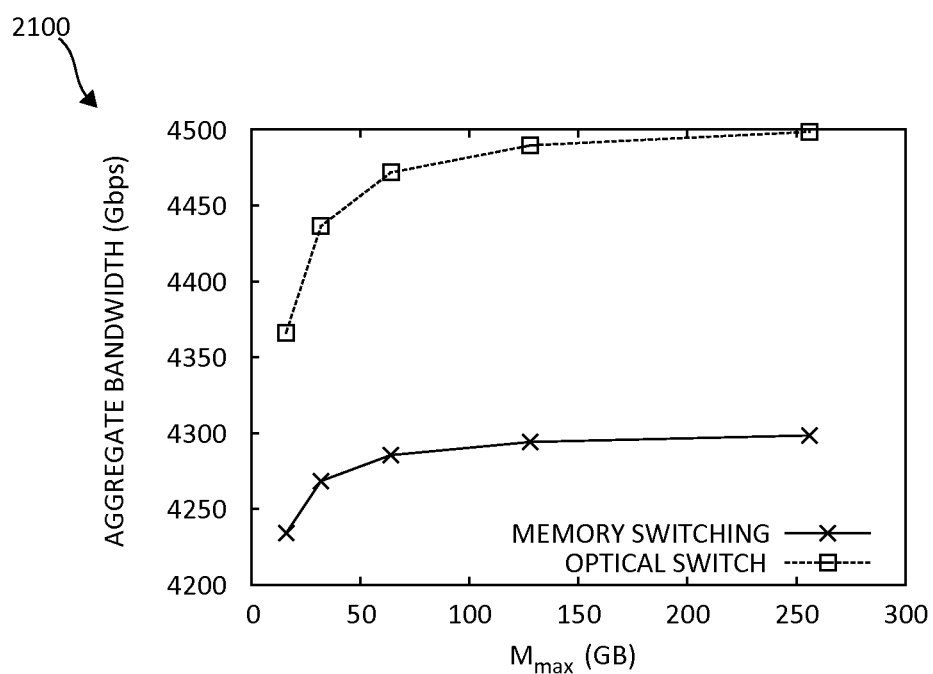
FIG. 21 is a graph chart diagram illustrating aggregate bandwidth (Gbps) with varying transfer (switching memory)
Figure 22:
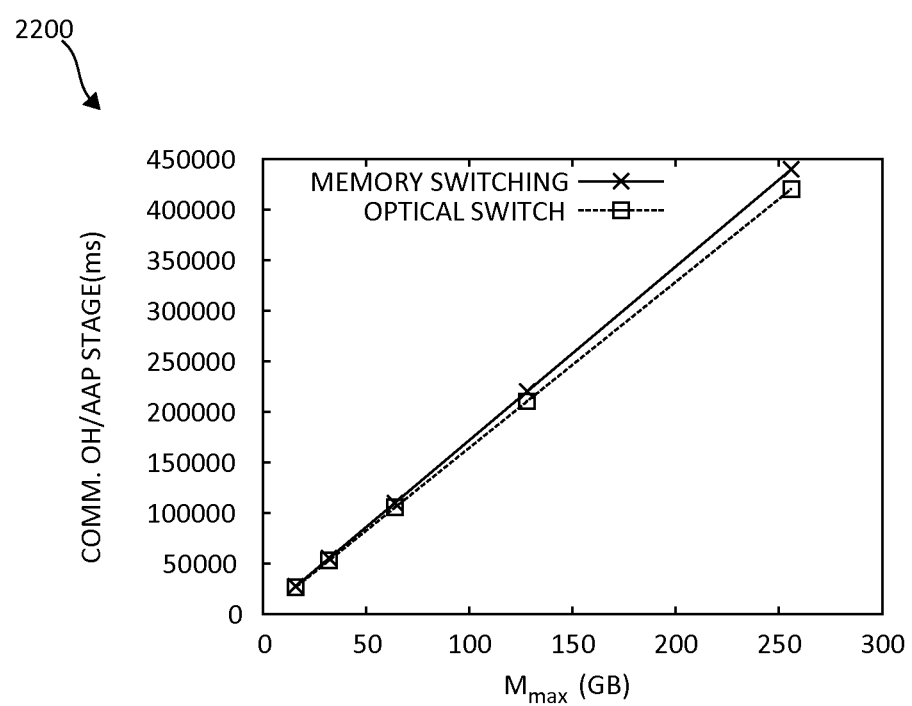
FIG. 22 is a graph chart diagram illustrating communication overhead (ms) with varying transfer (switching memory) size (GB).

FIG. 20 is a graph chart diagram 2000 illustrating aggregate bandwidth across racks with increasing matrix sizes. FIG. 20 shows the total aggregate bandwidth across racks with varying matrix sizes. The aggregate bandwidth is measured based on the total delay in an AAP phase and the volume of data shuffled across the racks in the AP phase. The flat or saturation region on aggregate bandwidth occurs due to Mmax-limit. Turning now to FIG. 21, a graph chart diagram 2100 illustrating aggregate bandwidth (Gbps) with varying transfer (switching memory) is depicted. With the increase in Mmax, the aggregate bandwidth increases up to a certain upper bound (FIG. 21); the upper bound is limited by the optical channel bandwidth and other overheads (e.g., optical circuit switching delay, latency at the edge level switches, etc.). In case of optical memory switching, the aggregate bandwidth is lower due to redundant data storage at the active nodes, latencies due to meta-data transfer, address space management, etc. The communication overhead (within an AAP phase in an active node) with varying Mmax is shown in FIG. 22. FIG. 22 is an exemplary graph chart diagram 2200 illustrating communication overhead (ms) with varying transfer (switching memory) size (GB). In the FIG. 22, inter-rack data transfer using optical switches attains higher aggregate bandwidth while compared to that with memory switching operation.

The foregoing embodiments seek to provide a solution for memory switching via optically connected processors in processors racks with memory in memory racks. The decrease in memory capacity per core due to growing imbalance between the rate of growth in cores per sockets and in memory density motivates the redesign of memory subsystem by organizing processors and memories in separates ensembles and connecting them through optical interconnection fabrics. In one embodiment, an architectural approach that exploits the switching fabrics to transfer large volume of data across processor blades in a transparent fashion is used. Memory allocation at the receiving side is eliminated and the processing startup delay involving large volume data transfer is reduced, as the communication avoids physically moving (for example copying) data over electrical links. Two communication patterns are supported: All-to-All personalized (AAP) communication and All-to-all broadcast (AAB) communication. In one example using model-based simulation, the performance metrics (e.g., communication delay, bandwidth) in a large-scale system are analyzed, and the feasibility of supporting different communication patterns with optically switching memory is illustrated. While the performance gain of memory switching with data gathering is dependent on the bandwidth of the electrical switch, optically switching memory without data gathering is effective in applications requiring large volume data transfer across processor blades without being locked into any synchronization barrier involving a number of compute blades. The performance data demonstrates the effectiveness of switching memory in transparent data sharing and communication within a rack.

It should be noted that the illustrated embodiments may be applied to cloud computing for enabling virtualization. For example, by using the optically switching memory operations, most of the dataset of virtual machine (VM) jobs from a remote memory access can still be used and have cache layers and smaller local processors for the memory data. Within the cloud-computing environment, the flexibility to move a dataset around to better load balance the VM jobs is allowed. For example, because the VM data migration requires a copy of very large datasets from one local memory to another, the remote memory is optically switched for connecting to another processor (e.g., a less busy processor) to avoid the copying of the very large datasets.

In addition, the illustrated embodiments provide for increased efficiency and productivity relating to resource enablement for provisioning, deployment, elasticity, and workload management by adding memory capacity as needed for a group of nodes and may simplify workload management (requires organization of blades and data). Moreover, within a system management of a computing system, the illustrated embodiments, as described above, provide a solution to a memory wall (in part) because data, as well as memory, become a dynamic resource that can be switched around the system.

In addition, the illustrated embodiments may be applied to databases (including streaming) where data is processed by a group of processors, intermediate results are recorded, the data is moved to another group, and includes a partial state recorded in the local memory for each processor. Also, the latency due to distant access (speed of light 5 nsec/m fiber) does not affect performance. The cache and prefetching (streams) reduce the latency as well.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. In an optically-connected memory (OCM) system, a method for a memory switching protocol, comprising:
at a side of sending nodes, performing each of:
collecting data by an active node of the sending nodes from passive nodes and arranging and storing the collected data according to receiving nodes, and
extracting, by a source node, a data format and a remote memory blade identification (ID), a remote memory blade address, and ranges of a remote machine memory address (RMMA) space, and composing and sending metadata to the receiving nodes and receiving racks;
wherein the optically-connected memory (OCM) system includes a plurality of processors arranged in processor blades and memory in memory blades, with each of the processor blades and the memory blades organized in racks communicatively coupled through an optical-switching fabric, the processor blades and the memory blades remotely separated;
at a side of the receiving nodes, performing each of:
receiving the metadata sent by the source node,
grafting the RMMA space onto an available system memory address (SMA) space of one of the plurality of processors into mapping tables,
if a circuit with a remote memory blade does not already exist, setting up a circuit with the remote memory blade, and
reading the data by an active node of the receiving nodes and sending the data to passive processor nodes via an intra-rack edge switch, wherein the data at the RMMA space retains routing information for different portions of the data; and
upon transmission of all the data in the RMMA space, performing, by the active node of the sending nodes, one of relinquishing the memory to memory manager at the memory blades and reuses the memory with new data arriving for a subsequent operation for dynamically switching the memory.

2. The method of claim 1, further including unmapping the RMMA space by the source node thereby removing all entries in page tables that map a linear address to a remote RMMA space, wherein system memory address (SMA) space that is associated with alternative RMMA space is free.

3. The method of claim 2, further including performing the unmapping on the side of the sending nodes.

4. The method of claim 2, further including performing one of the collecting, the extracting, and the unmapping for dynamically switching the memory through the optical-switching fabric using a selected one of a plurality of available communication patterns to transfer the RMMA space in the memory blades from the one of the plurality of processors to an alternative one of the plurality of processors in the processor blades without physically copying data in the memory to the plurality of processors.

5. The method of claim 1, further including retaining the data in the memory while sending the metadata to the plurality of processors for regenerating mapping tables and page tables on the processor blades with information included in the metadata.

6. The method of claim 1, wherein the processor blades and the memory blades are configured with a plurality of channels, and further including accessing the memory through the plurality of channels.

7. The method of claim 1, wherein the memory blades are communicatively coupled with the plurality of processors in the optical-switching fabric via an optical circuit network comprising a plurality of optical external links and at least one optical circuit switch, and further including allowing access of the plurality of processors to the memory in the memory blades through at least one independent circuit established between the processor blades and the memory blades within the optical circuit network.

8. The method of claim 7, further including sharing the memory in the memory blades between more than one of the plurality of processors by occupying a non-overlapping portion of the memory.

9. The method of claim 1, further including performing at least one of:
allocating memory from one of the memory blades upon receiving a memory request from the one of the plurality of processors, wherein a circuit is established with the memory for the one of the plurality of processors, an address space of the memory sent to the one of the plurality of processors,
mapping the address space of the memory to a system memory address (SMA) space upon the one of the plurality of processors receiving the address space of the memory, wherein entries of a page table corresponding to the address space are created,
retaining a remote memory superpage of the memory in the memory blade when reading the remote memory superpage of the memory into the one of the plurality of processors, and
transferring a physical memory address space from the one of the plurality of processors to an alternative one of the plurality of processors.

10. The method of claim 1, further including disconnecting a circuit to one of the memory blades while signaling another one of the memory blades to establish a circuit with another one of the memory blades.

11. The method of claim 1, further including performing at least one of:
sending the metadata and a switching request to the one of the plurality of processors, adjusting a remote machine memory address (RMMA) space and flushing a translation look-aside buffer (TLB),
performing an unmapping operation for removing entries in page tables that map a linear address to the RMMA space, grafting the RMMA space onto an available system memory address (SMA) space of the one of the plurality of processors and regenerating the mapping table,
dynamically switching the memory from an active node of the one of the plurality of processors to a remote active node of an alternative one of the plurality of processors, and using page tables by a receiving one of the plurality of processors for instantaneous access to the data.

12. An optically-connected memory (OCM) system for a memory switching protocol, comprising:
a plurality of nodes including at least a source node, passive nodes, and receiving nodes,
at least one processor blade, at least one memory blade, remotely separated from the at least one processor blade, an optical plane, an least one processor device arranged in one of the at least one processor blade and the at least one memory blade and in communication with the optical plane, a translation look-aside buffer (TLB) in communication with the at least one processor device and the optical plane, at least one memory in the at least one memory blade, and an optical switching fabric communicatively coupled between the at least one processor blade and the at least one memory blade and in communication with the at least one processor device, and the at least one processor device in communication with each of the plurality of nodes and operable in a computing storage environment;

wherein the at least one processor device at a side of sending nodes performs each of:

collects data by an active node of the sending nodes from passive nodes and arranges and stores the collected data on receiving nodes, and extracts, by the source node, a data format and a remote memory blade identification (ID), a remote memory blade address, and ranges of a remote machine memory address (RMMA) space, and composes and sends metadata to the receiving nodes and receiving racks;

wherein the at least one processor device at a side of the receiving nodes performs each of:

receiving the metadata sent by the source node, grafting the RMMA space onto an available system memory address (SMA) space of one of a plurality of processors into mapping tables, if a circuit with a remote memory blade does not already exist, setting UP a circuit with the remote memory blade, reading the data by an active node of the receiving nodes and sending the data to passive processor nodes via an intra-rack edge switch, and wherein the data at the RMMA space retains routing information for different portions of the data; and upon transmission of all the data in the RMMA space, performing, by the active node of the sending nodes, one of relinquishing the memory to memory manager at the memory blades and reuses the memory with new data arriving for a subsequent operation for dynamically switching the memory.

13. The system of claim 12, wherein the at least one processor device unmaps the RMMA space by the source node thereby removing all entries in page tables that map a linear address to a remote RMMA space, wherein system memory address (SMA) space that is associated with alternative RMMA space is free.

14. The system of claim 13, wherein the at least one processor device further performs the unmapping on the side of the sending nodes.

15. The system of claim 13, wherein the at least one processor device performs one of collecting, extracting, and unmapping for dynamically switching the memory through the optical-switching fabric using a selected one of a plurality of available communication patterns to transfer the RMMA space in the memory blades from the one of the plurality of processors to an alternative one of the plurality of processors in the processor blades without physically copying data in the memory to the plurality of processors.

16. The system of claim 12, wherein the at least one processor device retains the data in the memory while sending the metadata to the plurality of processors for regenerating mapping tables and page tables on the processor blades with information included in the metadata.

17. The system of claim 12, wherein the processor blades and the memory blades are configured with a plurality of channels, and further including accessing the memory through the plurality of channels.

18. The system of claim 12, wherein the memory blades are communicatively coupled with the plurality of processors in the optical-switching fabric via an optical circuit network comprising a plurality of optical external links and at least one optical circuit switch, and further including allowing access of the plurality of processors to the memory in the memory blades through at least one independent circuit established between the processor blades and the memory blades within the optical circuit network.

19. The system of claim 18, wherein the at least one processor device shares the memory in the memory blades between more than one of the plurality of processors by occupying a non-overlapping portion of the memory.

20. The system of claim 12, wherein the at least one processor device performs at least one of:

allocating memory from one of the memory blades upon receiving a memory request from the one of the plurality of processors, wherein a circuit is established with the memory for the one of the plurality of processors, the address space of the memory sent to the one of the plurality of processors, mapping the address space of the memory to a system memory address (SMA) space upon the one of the plurality of processors receiving the address space of the memory, wherein entries of a page table corresponding to the address space are created, retaining a remote memory superpage of the memory in the memory blade when reading the remote memory superpage of the memory into the one of the plurality of processors, and transferring a physical memory address space from the one of the plurality of processors to an alternative one of the plurality of processors.

21. The system of claim 12, wherein the at least one processor device disconnects a circuit to one of the memory blades while signaling another one of the memory blades to establish a circuit with another one of the memory blades.

22. The system of claim 12, wherein the at least one processor device performs at least one of:

sending the metadata and a switching request to the one of the plurality of processors, adjusting a remote machine memory address (RMMA) space and flushing the translation look-aside buffer (TLB), performing an unmapping operation for removing entries in page tables that map a linear address to the RMMA space, grafting the RMMA space onto an available system memory address (SMA) space of the one of the plurality of processors and regenerating the mapping table, dynamically switching the memory from an active node of the one of the plurality of processors to a remote active node of the alternative one of the plurality of processors, and using the page tables by a receiving one of the plurality of processors for instantaneous access to the data.

23. In an optically-connected memory (OCM) system, for a memory switching protocol, a plurality of processors arranged in processor blades and memory in memory blades, with each of the processor blades and the memory blades organized in racks communicatively coupled through an optical-switching fabric, the processor blades and the memory blades remotely separated, a computer program product in a computing environment using a processor device, the computer program product comprising a non-transitory computer-readable storage medium having computer-readable program code portions stored therein, the computer-readable program code portions comprising:

at a side of sending nodes, a first executable portion performing each of:

collecting data by an active node of the sending nodes from passive nodes and arranges and stores the collected data according to receiving nodes, and collecting, by a source node, a data format and a remote memory blade identification (ID), a remote memory blade address, and ranges of the RMMA space, and composes and sends metadata to the receiving nodes and receiving racks;

at a side of the receiving nodes, a second executable portion that performs each of:

receiving the metadata sent by the source node, grafting the RMMA space onto an available system memory address (SMA) space of the one of the plurality of processors into mapping tables, if a circuit with a remote memory blade does not already exist, setting up a circuit with the remote memory blade, and reading the data by an active node of the receiving nodes and sending the data to passive processor nodes via an intra-rack edge switch, wherein the data at the RMMA space retains routing information for different portions of the data; and upon transmission of all the data in the RMMA space, performing, by the active node of the sending nodes, one of relinquishing the memory to memory manager at the memory blades and reuses the memory with new data arriving for a subsequent operation for dynamically switching the memory.

24. The computer program product of claim 23, further including a third executable portion that unmaps the RMMA space by the source node thereby removing all entries in page tables that map a linear address to a remote RMMA space, wherein system memory address (SMA) space that is associated with alternative RMMA space is free.

25. The computer program product of claim 24, further including a fourth executable portion that performs the unmapping on the side of the sending nodes.

26. The computer program product of claim 24, further including a fourth executable portion that performs one of the collecting, the extracting, and the unmapping for dynamically switching the memory through the optical-switching fabric using a selected one of a plurality of available communication patterns to transfer the RMMA space in the memory blades from one of the plurality of processors to an alternative one of the plurality of processors in the processor blades without physically copying data in the memory to the plurality of processors.

27. The computer program product of claim 23, further including a third executable portion that retains the data in the memory while sending the metadata to the plurality of processors for regenerating mapping tables and page tables on the processor blades with information included in the metadata.

28. The computer program product of claim 23, wherein the processor blades and the memory blades are configured with a plurality of channels, and further including accessing the memory through the plurality of channels.

29. The computer program product of claim 23, wherein the memory blades are communicatively coupled with the plurality of processors in the optical-switching fabric via an optical circuit network comprising a plurality of optical external links and at least one optical circuit switch, and further including allowing access of the plurality of processors to the memory in the memory blades through at least one independent circuit established between the processor blades and the memory blades within the optical circuit network.

30. The computer program product of claim 29, further including a third executable portion that shares the memory in the memory blades between more than one of the plurality of processors by occupying a non-overlapping portion of the memory.

31. The computer program product of claim 23, further including a third executable portion that performs at least one of:

allocating memory from one of the memory blades upon receiving a memory request from the one of the plurality of processors, wherein a circuit is established with the memory for the one of the plurality of processors, the address space of the memory sent to the one of the plurality of processors, mapping the address space of the memory to a system memory address (SMA) space upon the one of the plurality of processors receiving the address space of the memory, wherein entries of the page table corresponding to the address space are created, retaining a remote memory superpage of the memory in the memory blade when reading the remote memory superpage of the memory into the one of the plurality of processors, and transferring a physical memory address space from the one of the plurality of processors to an alternative one of the plurality of processors.

32. The computer program product of claim 23, further including a third executable portion that disconnects a circuit to one of the memory blades while signaling another one of the memory blades to establish a circuit with the another one of the memory blades.

33. The computer program product of claim 23, further including a third executable portion that performs at least one of:

sending the metadata and a switching request to the one of the plurality of processors, adjusting a remote machine memory address (RMMA) space and flushing a translation look-aside buffer (TLB), performing an unmapping operation for removing entries in page tables that map a linear address to the RMMA space, grafting the RMMA space onto an available system memory address (SMA) space of the one of the plurality of processors and regenerating the mapping table, dynamically switching the memory from an active node of the one of the plurality of processors to a remote active node of an alternative one of the plurality of processors, and using the page tables by a receiving one of the plurality of processors for instantaneous access to the data.

* * * * *